United States Patent
Eilam et al.

(10) Patent No.: US 7,516,457 B2
(45) Date of Patent: Apr. 7, 2009

(54) COMPONENTIZED AUTOMATIC PROVISIONING AND MANAGEMENT OF COMPUTING ENVIRONMENTS FOR COMPUTING UTILITIES

(75) Inventors: Tamar Eilam, New York, NY (US);
Sandra D. Miller, Irvington, NY (US);
Lily Barkovic Mummert, Eighty Four, PA (US); Guerney Douglass Holloway Hunt, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/587,615

(22) PCT Filed: Jan. 30, 2004

(86) PCT No.: PCT/US2004/002637
§ 371 (c)(1),
(2), (4) Date: Jun. 22, 2007

(87) PCT Pub. No.: WO2005/081672
PCT Pub. Date: Sep. 9, 2005

(65) Prior Publication Data
US 2007/0297350 A1    Dec. 27, 2007

(51) Int. Cl.
*G06F 9/46* (2006.01)

(52) U.S. Cl. .................................. 718/104; 709/226
(58) Field of Classification Search ............... 709/200, 709/202, 217, 219, 223, 224, 225, 226, 229; 707/200, 201, 203; 718/100–105; 717/127
See application file for complete search history.

(56) References Cited

U.S. PATENT DOCUMENTS

| | | | | |
|---|---|---|---|---|
| 6,308,208 B1 * | 10/2001 | Jung et al. | ................. | 709/224 |
| 7,050,807 B1 * | 5/2006 | Osborn | ..................... | 455/445 |
| 7,363,363 B2 * | 4/2008 | Dal Canto et al. | ........... | 709/223 |
| 2003/0135628 A1 * | 7/2003 | Fletcher et al. | ............. | 709/229 |
| 2003/0217166 A1 * | 11/2003 | Dal Canto et al. | ........... | 709/229 |

* cited by examiner

*Primary Examiner*—Van H Nguyen
(74) *Attorney, Agent, or Firm*—Louis J. Percello

(57) ABSTRACT

The present invention provides systems, methods and apparatus for automatically provisioning and managing resources in a computing utility. Its automation procedures are based on a resource model which allows resource-specific provisioning and management tasks to be encapsulated into components for reuse. These components are assembled into more complex structures and finally computing services. This invention provides a method for constructing a computing service from a set of resources given a high level specification. Once constructed, the service includes a component that provides management function, which can allow modification of its underlying set of resources.

1 Claim, 19 Drawing Sheets

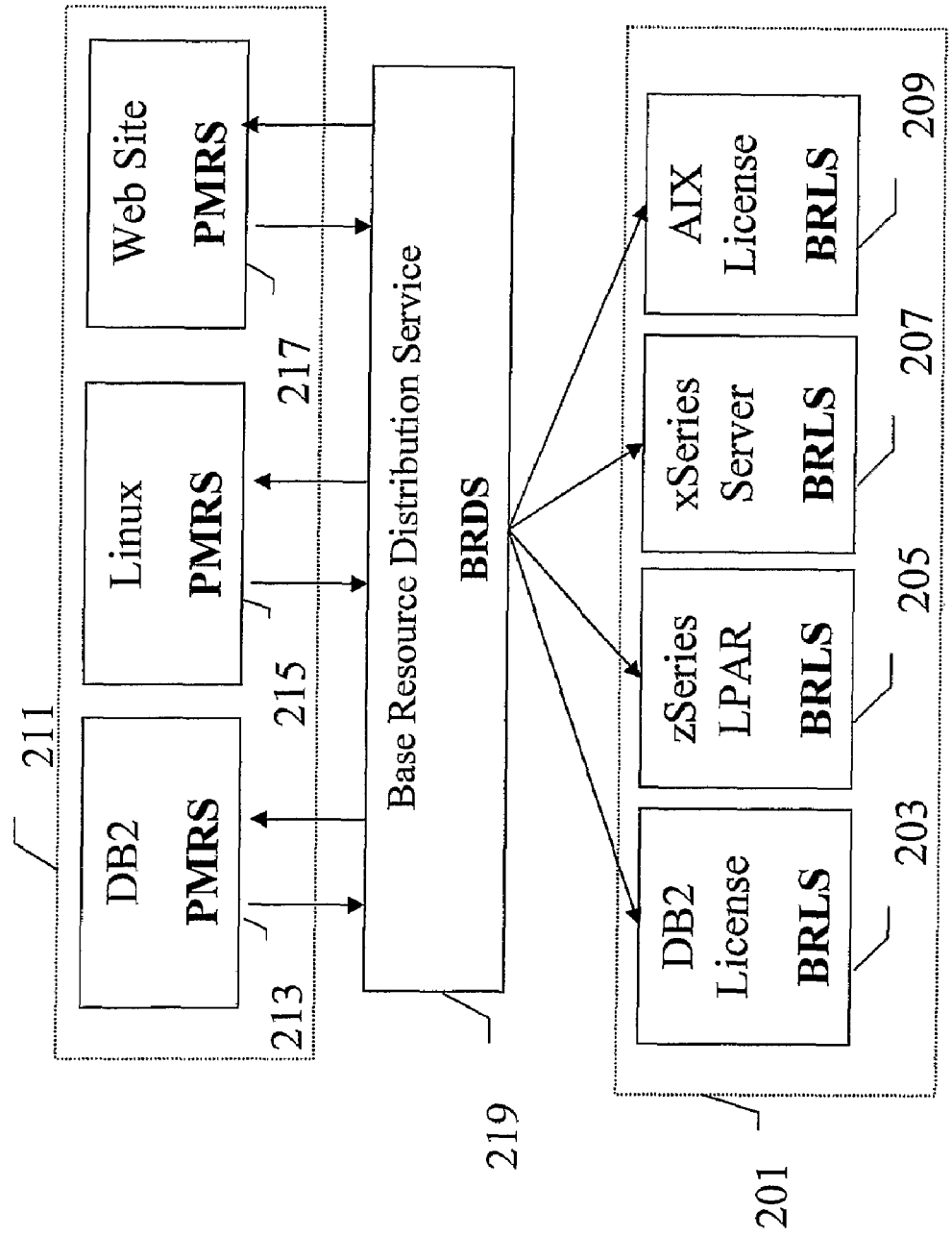

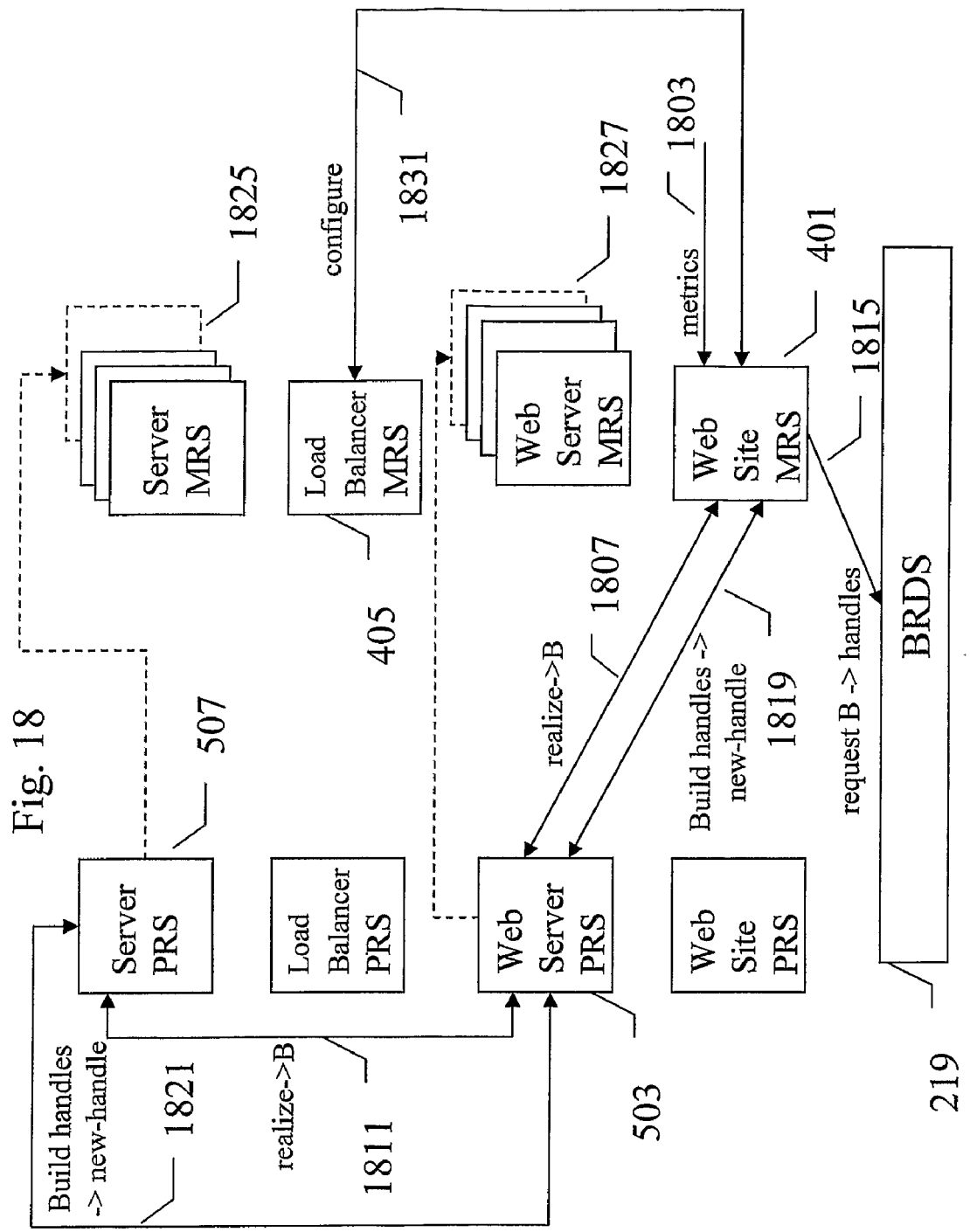

COMPONENTIZED AUTOMATIC PROVISIONING AND MANAGEMENT OF COMPUTING ENVIRONMENTS FOR COMPUTING UTILITIES

CROSS REFERENCE AND PRIORITY

This application filed under 35 USC 371, is cross-referenced with, and claims priority from, International Patent Application PCT/US2004/002637 filed on Jan. 30, 2004, and published in English with Publication No. WO 2005/081672 on Sep. 9, 2005, under PCT article 21(2).

The present application is also cross-referenced and claims priority from, International Patent Application PCT/US2004/002696 filed on Jan. 30, 2004, and published in English with Publication No. WO 2005/083576 on Sep. 9, 2005, under PCT article 21(2) entitled "Hierarchical Resource Management for a Computing Utility", and filed under PCT article 21(2), even dated herewith, and which is included herein by reference in entirety for all purposes.

FIELD OF THE INVENTION

The present invention is directed to provisioning and management of resources in a computing utility, which uses the resources to provide computing services to customers. It is more particularly directed to componentized automatic provisioning and management of computing environments for the computing utility.

BACKGROUND

A hosting center provides computing services to multiple customers. Each customer is allocated a subset of the service provider's infrastructure resources, such as servers, to meet its needs. Customer needs change over time, and in particular, peak demands for resources can exceed average demands by orders of magnitude. A simple static allocation of resources to satisfy peak demand leaves resources underutilized. Reconfiguring infrastructure resources dynamically, in response to customer needs, demands prompt attention from administrative personnel, increasing both operational costs and the risk of failing to provide adequate service. The problem for the hosting center is how to respond quickly to changes in customer needs such that infrastructure resources and staff are employed in an efficient and cost effective way. Computing utilities attempt to address this problem by automating the creation and management of one or more computing services on shared infrastructures.

Previous work in computing utilities varies in the types of services that are offered, the resources that are used, and the extent to which operation is automated. Operations subject to automation are wide ranging, and include creating services, deploying a service for a customer, modifying the set of resources used to provide the service, and incorporating new resource instances and types into the hosting center and its services.

One system automated the provisioning of front end servers in Web sites based on metrics such as server load and response time. It included a component that discovered server and network topology automatically. Another system provided a variety of multi-tier Web sites in which pre-configured servers could be allocated to different tiers automatically based on metrics such as server load. Another system also allocated server resources in response to server load, but modeled both the value of allocating resources to each customer and the cost of employing those resources, with an emphasis on energy cost. More recent work includes allocation of other resource types such as memory and storage, and allocation of servers for general use.

A growing number of industrial products aim to provide multi-tier applications over a physical infrastructure consisting of a variety of resource. They vary in many respects, such as the types of resources provided (e.g., servers and storage); specific operating systems and middleware supported; assumptions and characteristics of the network infrastructure (e.g., whether or not network isolation is provided via VLAN); level of monitoring support (e.g., resource usage, failure detection, SLA, threshold based alerting); support for resource discovery; support for modifying service resources once deployed; whether modifications can occur automatically (e.g., triggered by SLAs); and the extent to which the products can or must be customized to fit preexisting hosting center infrastructures.

Work is being done at the application layer to automate deployment and management of distributed applications. An application is described as a collection of related, reusable components, which may represent resources or subsystems. The description of an application includes dependency information to ensure that, for example, components are started in the correct sequence. This is not used for low level resource configuration tasks such as installing operating systems on servers, but for higher level application specific configuration.

Provisioning refers to the process of allocating a set of infrastructure resources and configuring them to provide the desired computing services for use by a customer. Provisioning is a complex set of tasks that can include configuring network devices, installing operating systems and application software, obtaining software licenses, installing monitors, and enabling customer access by creating user accounts.

Provisioning is automated by codifying the procedures or scripts for these tasks. Some products provide a GUI interface to assist in the creation and selection of these procedures. For example, a drag and drop interface may be used to specify the "virtual wiring" of resources for an application environment to be deployed. Virtual wiring could include the tier structure of the environment, rules for firewalls, and which operating system to install on servers. The wiring diagram is captured as a template description. This description is used to create and delete environments, and it may be modified to add or remove resources from a computing environment.

In some systems codifying the procedures is done on a service specific basis. Changes in resource types, connectivity, or service requirements can require re-implementation of these procedures. If they are implemented in an ad hoc manner or independently, it can be difficult to systematically enforce best practices or operational constraints. Thus, it is desirable to provide a system that improves upon the prior art.

SUMMARY OF INVENTION

This invention provides methods and apparatus for automatically provisioning and managing resources in a computing utility. Its automation procedures are based on a resource model which allows resource-specific provisioning and management tasks to be encapsulated into components for reuse. These components are assembled into more complex structures and finally computing services. Included are methods and apparatus for automatically provisioning and managing resources in a computing utility. Its automation procedures are based on a resource model which allows resource-specific provisioning and management tasks to be encapsulated into components for reuse. These components are assembled into more complex structures and finally computing services. This invention also provides a method for constructing a computing service from a set of resources given a high level specification. Once constructed, the service includes a component that provides management function, which can allow modification of its underlying set of resources.

In an example embodiment, this invention provides a method for provisioning at least one computing environment in a computing utility. The method comprising: employing a description of each of said at least one computing environment, said description directing an invocation of a first service which performs said provisioning, said description being a composite resource definition; and invoking said first service to perform said provisioning.

In an example embodiment, this invention provides a method for adding a base resource type to an operating computing utility. The step of adding comprising: furnishing a base resource library service to represent any instance of said base resource type; adding any instance of said base resource type to the base resource library service; developing an implementation of a provisioning resource service for said base resource type; activating said provisioning resource service; and creating an implementation of a managed resource service for said base resource type.

In some embodiments, the method further comprising: updating any provisioning resource service of any composite resource type to use said provisioning resource service for said base resource type; and updating any managed resource service of any composite resource type to use said managed resource service for said base resource type.

In a further example embodiment, this invention provides a method for adapting at least one third party workload management system for a computing environment to a computing utility. The step of adapting comprising: developing a managed resource service, said managed resource service interpreting a state of said at least one third party workload management system; and modifying a set of base resources comprising said computing environment as indicated by the state of said at least one third party workload management system.

In an further example embodiment, this invention provides a method for constructing a computing service from a set of resources given a high level specification. Thus, this invention is also an element of a computing utility.

In a still further example embodiment, this invention provides an apparatus to provision at least one computing environment in a computing utility. The apparatus comprising: a first processor module to employ a description of each of said at least one computing environment, said description directing an invocation of a first service which performs said provisioning, said description being a composite resource definition; and a second processor module to invoke said first service to perform said provisioning.

BRIEF DESCRIPTION OF THE DRAWINGS

The foregoing and other objects, aspects and advantages will be better understood from the following detailed description of advantageous embodiments of the invention with reference to the drawings, in which:

FIG. 2 shows an example of a computing utility structure, in which the PMRS, in accordance with the present invention, is one of the components;

FIG. 18 is a use case that describes adding a Web server to a Web site service based on a load event in accordance with the present invention.

DEFINITION OF TERMS

Figure 1:
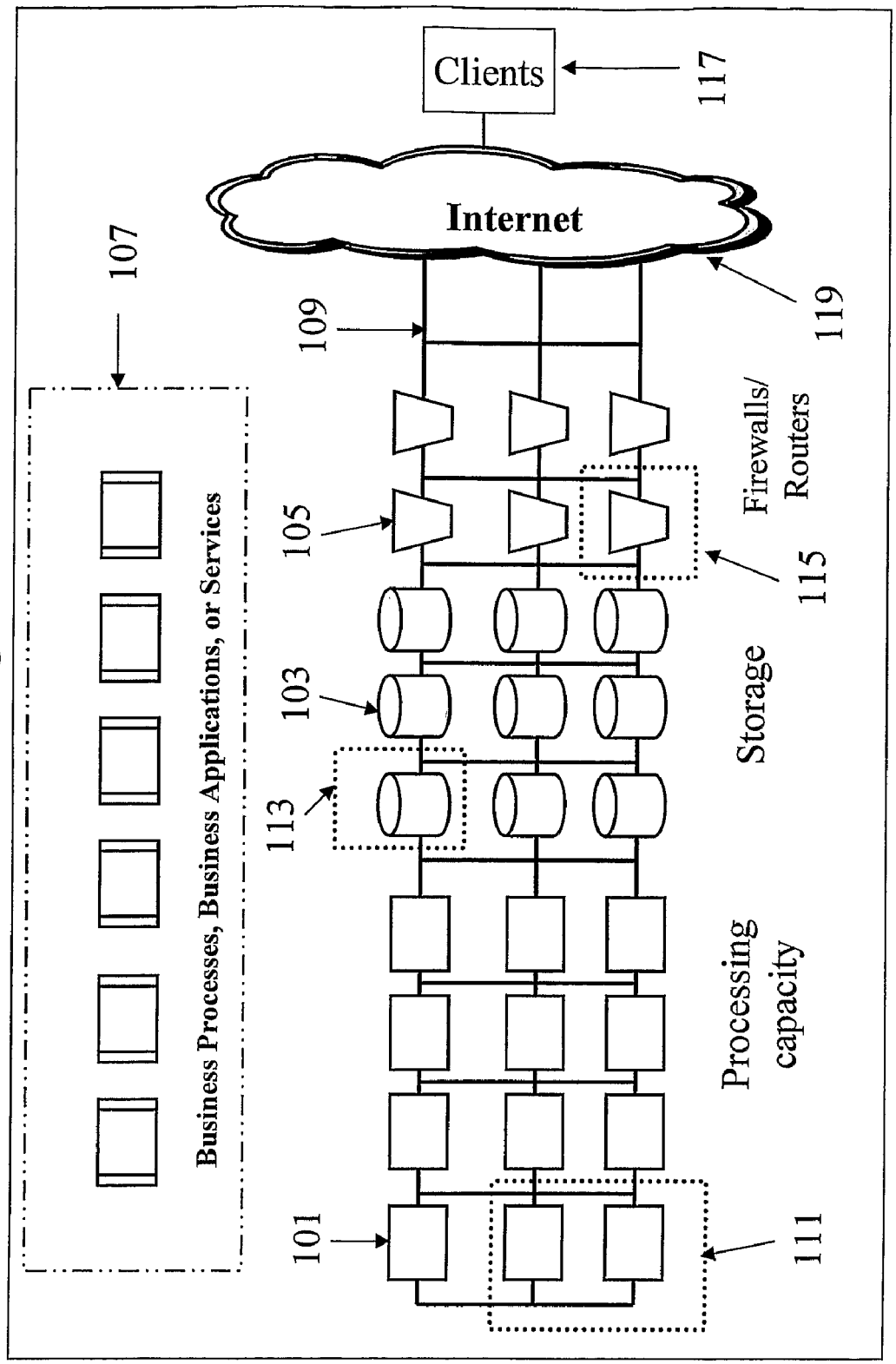
FIG. 1 depicts a hosting center, a system in which the present invention may be used.

A computing environment is a computing service provided to a customer. It includes hardware and software resources such as servers, operating systems, and middleware. This invention assumes that the resources allocated to a computing environment are dedicated to that computing environment for the duration of their allocation.

A service provider is assumed to be providing service for multiple computing environments. A service provider supplies a set of resources that may be allocated to provide computing services to its computing environments.

A base resource is a resource that is atomic; it cannot be broken down into other resources. An example of a base resource is a server or a software license. Any resource that a service provider does not want to subdivide can be treated as a base resource. Adding, removing, or modifying a base resource changes the overall capacity of the system. We assume that both the number and types of the base resources change over time. The notion of base resource is service provider specific.

A composite resource is built out of other resources to perform a specified function. A composite resource may have a set of dependencies associated with it. An example of a composite resource is a Web site. It may be composed of some number of front-end servers, back end servers, a load balancer, a set of IP addresses for the servers, Web server software, database software, and licenses associated with the software. The set of base resources used to implement the function of a composite resource can change over time, though not all composite resources may have this capability. In some cases, a resource within a composite resource is referred to as a sub-resource.

A resource may be requested by a computing environment either for an immediate or future allocation. The promise of a future resource allocation is a reservation.

DESCRIPTION OF THE INVENTION

This invention provides methods, systems and apparatus for automatically provisioning and managing resources in a computing utility in an environment that possesses the characteristics listed below. Together, these characteristics generalize the environments studied in previous work.

The present invention provides methods and apparatus for automatically provisioning and managing resources in a computing utility. Its automation procedures are based on a resource model which allows resource-specific provisioning and management tasks to be encapsulated into components for reuse. These components are assembled into more complex structures and finally computing services. This invention provides a method for constructing a computing service from a set of resources given a high level specification. Once constructed, the service includes a component that provides management function, which can allow modification of its underlying set of resources.

An example method provides for constructing a computing environment from a set of resources given a high level specification. It is a component of a computing utility that operates in an environment that possesses at least one of the characteristics listed below. Together, these characteristics generalize the environments studied in previous work.

First, resources may be allocated to customers in combinations which are heterogeneous, may be interdependent, and vary over time.

Second, the types of computing environments provided to each customer may be different. For example, one customer may be provided resources for a Web site, and another for a scientific computing cluster. Resource types, quantities, dependencies, and allocation patterns will thus vary between customers.

Third, there can be multiple ways to construct a computing environment from the resources in a service provider's infrastructure. A customer may have preferences or requirements for particular variations of a given computing environment, such as for particular brands of servers.

Fourth, the resource infrastructure varies between service providers. Further, for a given service provider, the infrastructure varies over time. These variations can be a result of upgrades or additions to the physical infrastructure, engaging the services of another provider, or inclusion of additional resources when idle or at certain times of day.

Finally, resources may be allocated in advance, or reserved.

The system in which the present invention is used is a distributed computer system which has multiple computing resources interconnected via a network. A diagram of such a system, which would be found in a hosting or data center, is shown in FIG. 1. The computing resources in the physical infrastructure include processors 101, storage 103, firewalls 105, and software 107. The software can be operating systems, middleware or applications. In FIG. 1 the available software has been pre-configured into business processes, business applications, or services. The hardware resources are connected by a network 109 as indicated by the grid of lines interconnecting all of these resources. This network may be configure into one or more tiers, where each tier is separated by a router or firewall. Software resources are assigned to physical resources by a management infrastructure. In this environment a subset of the resources are assigned to the management infrastructure. In FIG. 1 these resources 111, 113, and 115 are indicated by a dotted line surrounding them. The resources assigned to the management infrastructure run the management software described in this invention. This software manages the rest of the resources. The resources used for the management infrastructure are not assigned to customers of the hosted environment. The remaining resources are assigned to customers as necessary. It is expected that clients 117 will primarily receive service by connecting to their resources through the Internet 119. However, clients can receive service if they are connected to their resources by any means, such as through a direct connection to a managed resource.

FIG. 2 shows a high level view of a computing utility in which the present invention is a component. There are three layers of components. The bottom layer 201 represents the base resources. Each base resource type has a service that provides reservation and allocation of instances of that resource type, called the Base Resource Library Service (BRLS). This invention assumes that both the number and types of the base resources change over time. FIG. 2 shows four types of base resources and their BRLSs: DB2 software licenses 203, zSeries logical partitions 205, xSeries server hardware 207, and AIX licenses 209. The BRLS provides information such as cataloging, check out (allocation), check in (deallocation), and reservation. Each computing environment has a service which is invoked to provision and manage its resources, called the Provisioned and Managed Resource Service (PMRS). In FIG. 2, the top layer 211 shows the computing environments and their PMRSs. FIG. 2 shows three examples of computing environments, a DB2 environment 213, a Linux environment 215, and a Web site environment 217. In the middle layer, the Base Resource Distribution Service (BRDS) 219 determines how to distribute the base resources across the various computing environments. The BRDS specifies which sets of resources are available to which computing environments and automatically redistributes those resources based on business policies when resources are constrained.

Figure 2A:
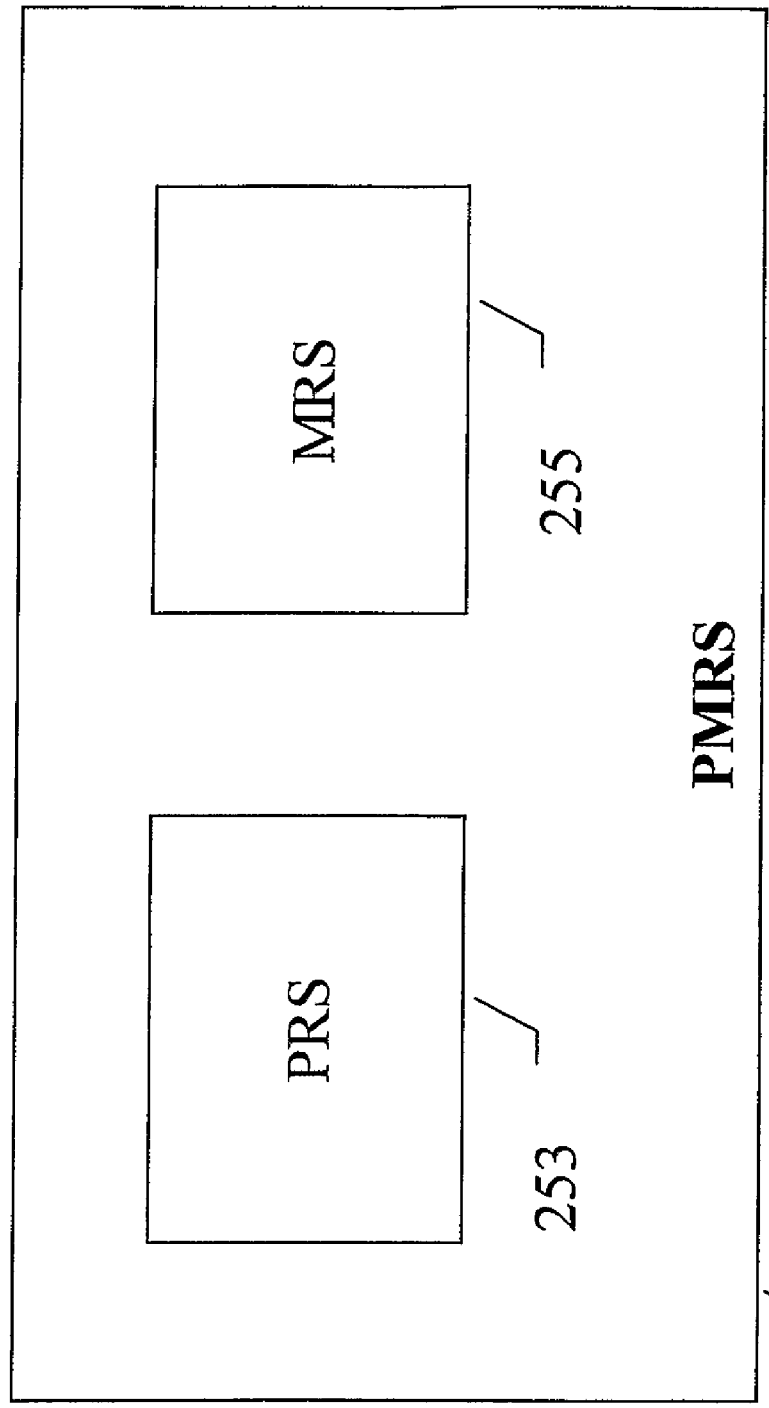
FIG. 2a shows an example of an internal structure of the PMRS in accordance with the present invention.

The resources assembled for a computing environment are modeled as composite resources. The model defines the structure of the composite resource in terms of its constituent resources. A set of services, called Provisioned and Managed Resource Services (PMRS), which are the focus of this invention, provision and manage composite resources. Every resource type has a PMRS that encapsulates the knowledge of how to create a resource of that type, and how to manage an instance of a resource of that type. Managing the resource may include such actions as adding or removing capacity from the resource instance. Thus, as shown in FIG. 2*a*, a PMRS 251 is composed of two parts: a Provisioning Resource Service (PRS) 253, which creates instances of the composite resource, and a Managed Resource Service (MRS) 255, which manages an instance of the composite resource. There is a single PRS for each resource type, and there is an MRS for every instance of a resource type.

Figure 3:
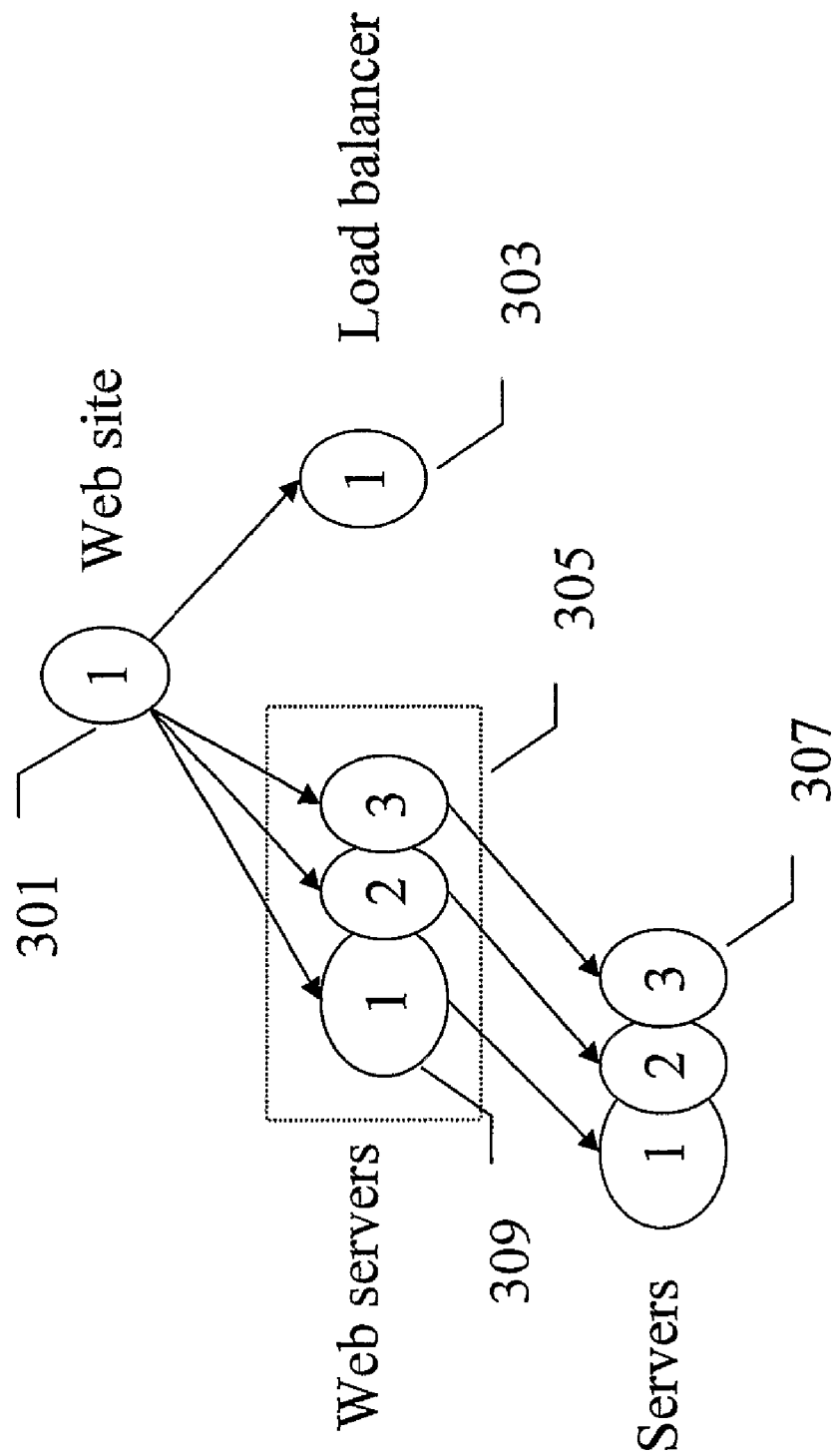
FIG. 3 shows a composite resource instance for a Web site.

Composite resources may be assembled using other composite resources. For example, a Web site composite resource instance may be composed of a load balancer, and a group of front end servers. A front end server is a composite resource which may be composed of a server, operating system, and Web server software. For this reason, PMRSs can be composed in a containment hierarchy that represents the structure of the composite resources in the computing environment. FIG. 3 shows an example of a Web site composite resource instance. Every node in the tree represents either a basic or a composite resource. The root of the tree 301 is the Web site composite resource. It contains a load balancer resource 303, which is a basic resource, and a Web server group composite resource 305. The Web server resource in turn contains a server resource 307.

A PMRS of a composite resource may use the PMRS of a sub-resource to create and manage instances of the sub-resource. This approach allows resource provisioning and management to be encapsulated on a per resource type basis. A PMRS for a composite resource only has to incorporate and reflect knowledge of the interdependencies between the sub-resources of the composite, since the internal knowledge of a sub-resource is encapsulated in the sub-resource's PMRS.

Figure 4:
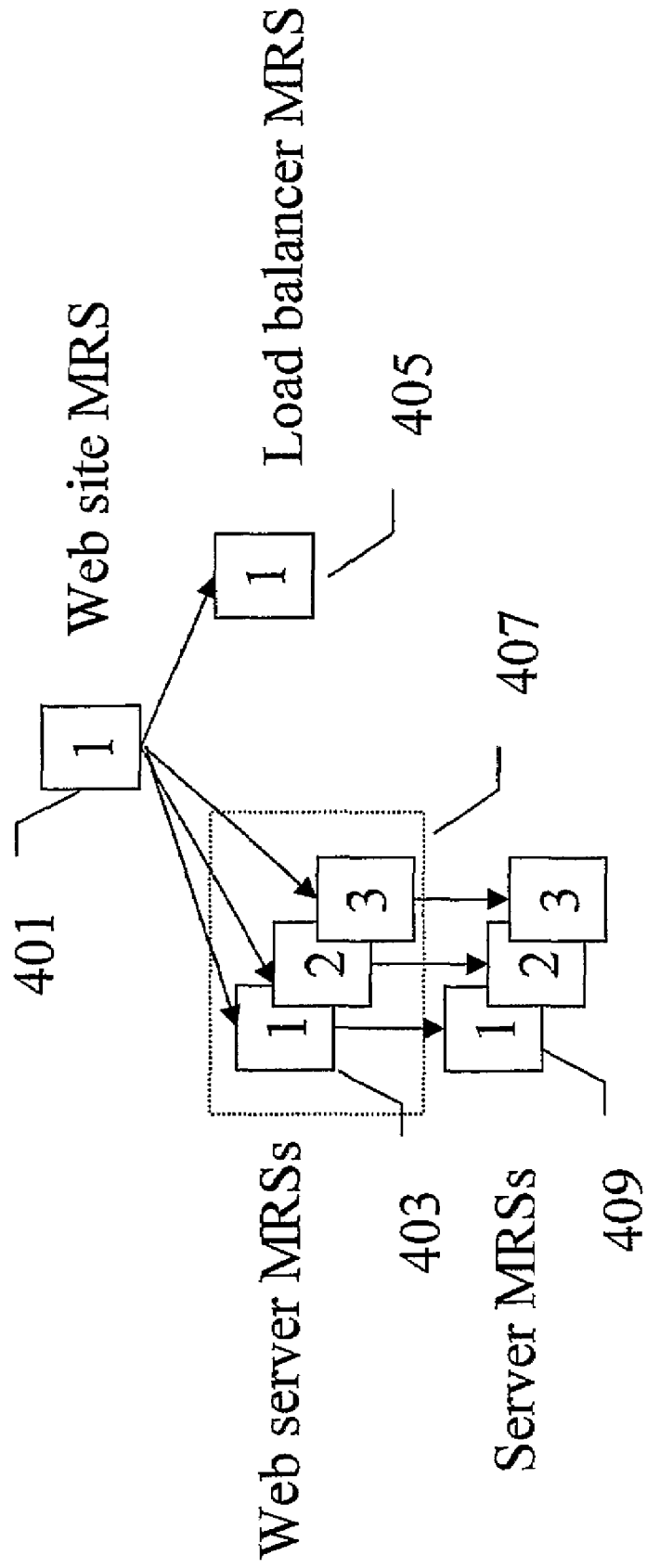
FIG. 4 shows an MRS hierarchy that corresponds to the composite resource instance of FIG. 2 in accordance with the present invention.

FIG. 4 shows the MRS hierarchy which corresponds to the Web site composite resource instance 301. Every MRS is responsible to manage a single resource instance. Thus, a Web-site MRS 401 is responsible to manage the entire Web site, whilst a Web server MRS 403 is responsible for managing Web server 309. An arrow from an MRS box to another indicates that the former uses the latter in order to perform its function. Thus, a Web-site MRS 401 may use information provided by the load balancer MRS 405 and the various Web server MRSs 407 in order to determine the root cause of a problem in the performance of the Web site, and web server MRS may in turn use server MRS 409. Web site MRS 401 may further use the MRSs of the sub-resources in order to perform corrective configuration actions on some composed resources. The process will be further described later.

Figure 5:
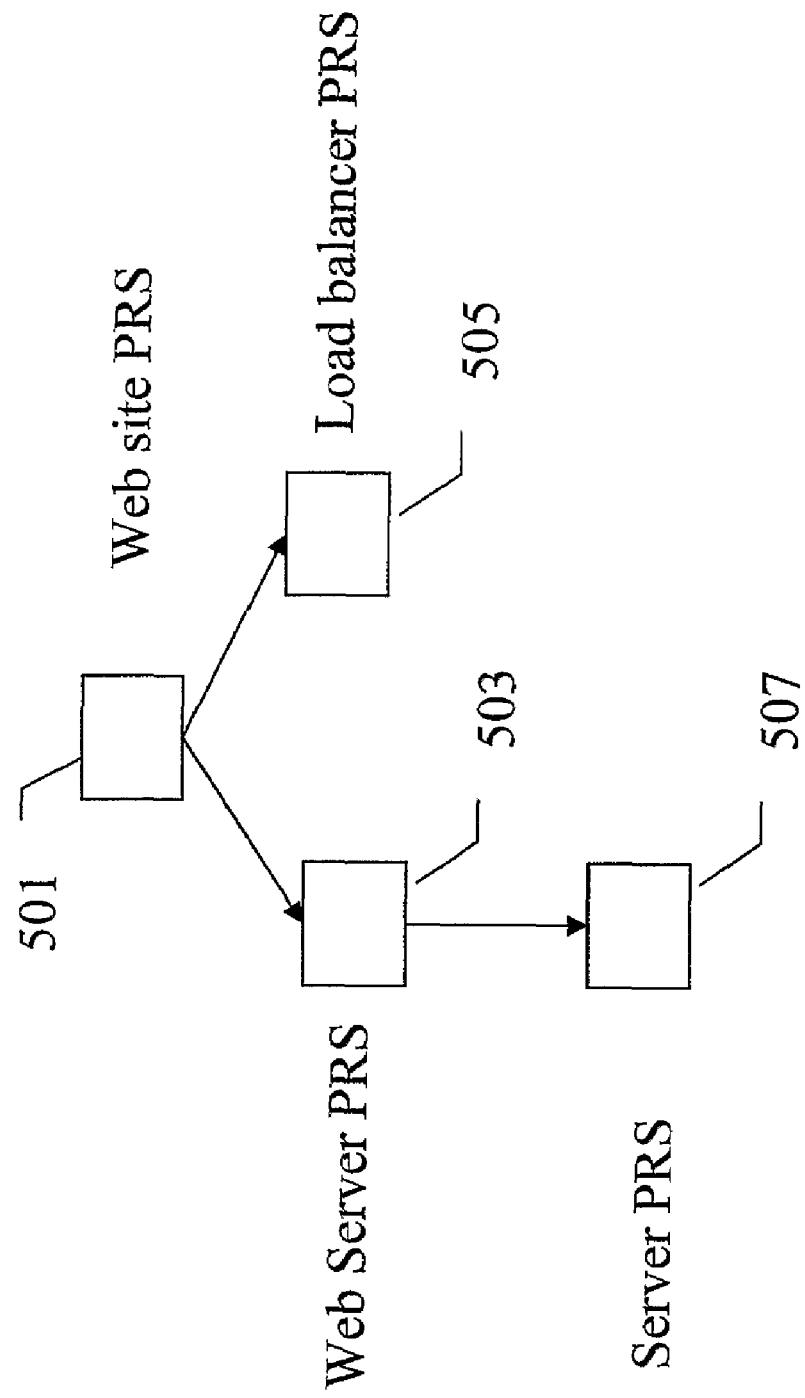
FIG. 5 shows a PRS hierarchy that corresponds to the composite resource instance of FIG. 2 in accordance with the present invention.

FIG. 5 shows the PRS hierarchy which corresponds to the Web site composite resource instance from FIG. 3. A PRS in this figure is responsible to create all instances of resource from the corresponding type. Thus, the root of the hierarchy is a Web site PRS 501 which is responsible for creating all Web site composite resource instances in the computing utility. The Web server PRS 503 is responsible for creating all Web server instances in the computing utility and so on. As in the case of the MRS hierarchy, an arrow from a PRS box to another indicate the former uses the latter in order to perform its function. Thus, the Web site PRS 501 uses both the Web server PRS 503 and the load balancer PRS 505 in order to build a Web site resource. It does not need to know how to build a Web server or a load balancer; this knowledge is encapsulated in the corresponding PRSs that it uses. It only needs to know that a Web site consists of Web servers and a load balancer and how to configure them, once they are created, to work together. The process will be further described later.

FIG. 3, FIG. 4, and FIG. 5 illustrate the idea of applying a recursive structure to the provisioning and management of systems. Thus, PRSs, and MRSs serve as generic building blocks for building more complex resources. An implementer of a PRS or MRS for a new composite resource does not have to re-implement the logic to create and manage any of the sub-resources. The implementer only needs to implement the increment; how the resources can be created and managed to work together to perform a higher function beyond the function that any single resource performs.

Provisioned Resource Service

A PRS creates instances of a composite resource type. It implements two phases in the creation of a composite resource—a planning phase and a building phase. In the PRS, the planning phase is implemented by a component called the realizer. The realizer maps an abstract description of a resource to a schema that describes the possible combinations of base resources needed to create it and the corresponding composite resource structure. It essentially supplies a plan for building the composite resource. Since there may be more than one way to create the resource, the realizer can supply multiple plans. The realizer takes into account resource types, but not availability of instances of a particular type, when providing plans. A realizer may use the realizers in PRSs of sub-resources, to create plans.

A second component, the builder, builds a resource instance given resource handles for the base resources required and a plan. It also disassembles resources when requested. Creating an instance of a composite resource may be multi-staged, where at each stage, resources are built from sub-resources incrementally by calling the Builder services of the sub-resources provisioning services, and then configured with respect to each other. The creation of a resource instance includes the instantiation of an MRS to manage it. Following the same logic, in the process of a creation of a composite resource a set of MRSs will be instantiated to manage the composite resource and its sub-resources cooperatively.

Realizer

The realizer encapsulates the possibilities for constructing a resource of a particular type from the base and composite resources available in the computing utility. It may supply one or more alternative plans for constructing the resource. In this case, it may also expose certain settings that can be used to restrict the set of alternatives it supplies. A realization is a structure that encodes the different alternatives. The realization can be represented in a number of structures such as a graph or binary decision diagram. The representation should be compact because the possible number of realizations of a complex structure could be large.

Figure 6:
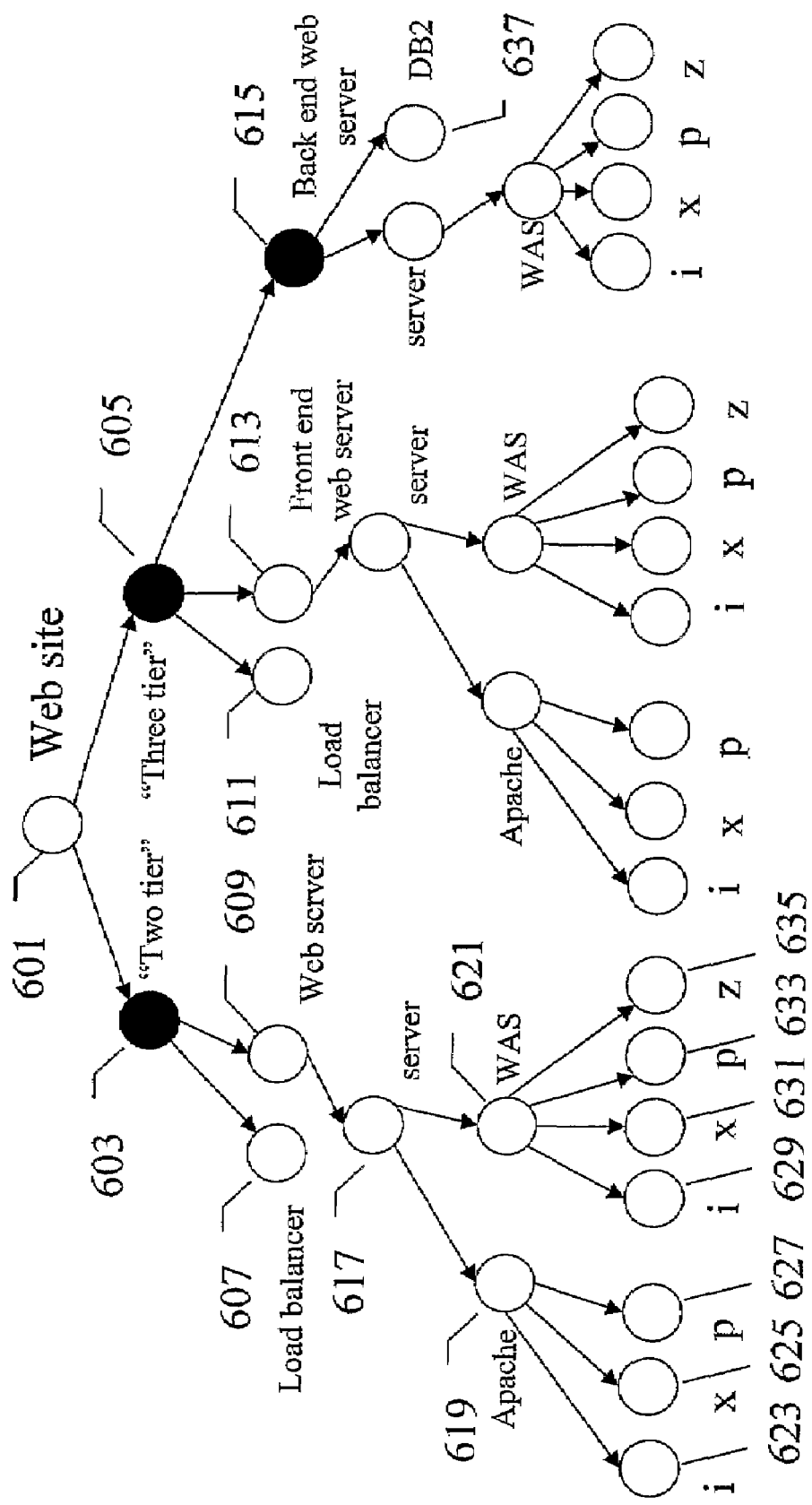
FIG. 6 shows a realization for a Web site composite resource in accordance with the present invention.

An example realization for a Web site resource is shown in FIG. 6. The nodes in the graph with children are of two types: AND nodes, shown in black, and OR nodes, shown in white. An AND node means that all the children of the node are required to construct the resource represented by the parent. An OR node means that any of its children may be used to construct the resource represented by the parent. The root node of the Web site graph 601 is an OR node, representing a two-tier alternative 603 and a three-tier alternative 605. The two-tier node 603 is an AND node composed of a load balancer 607 and a Web server 609. The three-tier node 605 is also an AND node composed of a load balancer 611, front end Web server 613, and back end Web server 615. The load balancer nodes 607 and 611 are base resources; they have no outgoing edges. The two-tier Web server node 609 is an OR node, with only one alternative; server node 617. The server node 617 is an OR node representing alternatives Apache Web server 619 and WAS Web server 621. The three-tier front end Web server node 613 is identical in structure to the two-tier Web server node 609. Apache Web server node 619 is an OR node representing servers of three IBM architectures, iSeries 623, xSeries 625, and pSeries 627. WAS Web server 621 is an OR node representing servers of four IBM architectures, iSeries 629, xSeries 631, pSeries 633, and zSeries 635. These servers are base resources, as is DB2 node 637.

Figure 7:
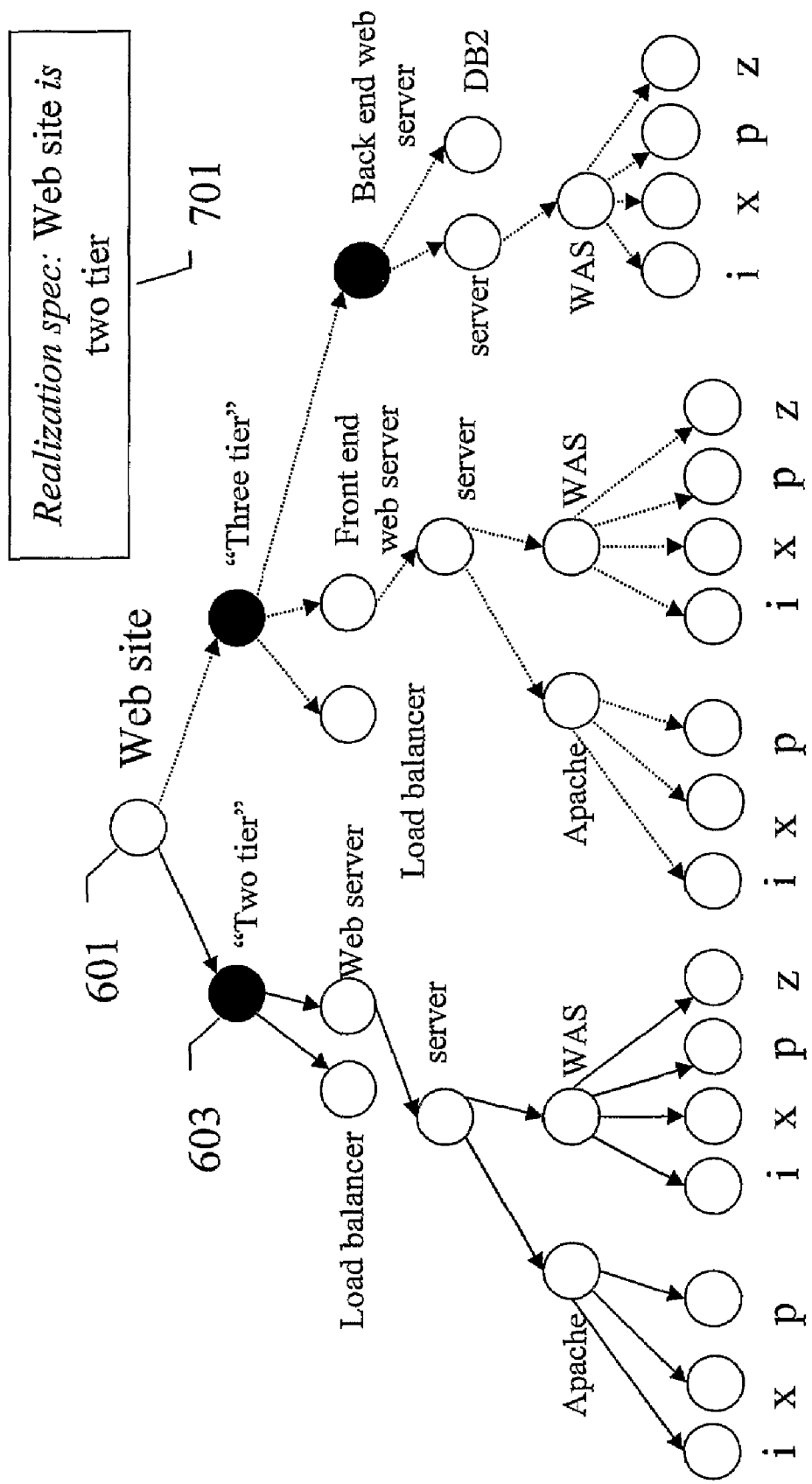
FIG. 7 shows a Web site realization pruned by tier attribute in accordance with the present invention.

A realizer for a resource type may allow the setting of certain attributes that can restrict the set of alternatives it supplies. These settings are specified as part of the realization-spec parameter of the realizes function described above. In the AND-OR graph representation shown in FIG. 7, an attribute 701 specifies a condition on the value of the descendant that is chosen for an OR node. The graph is pruned to eliminate descendants that do not satisfy the condition in the attribute. FIG. 7 shows the possible realizations corresponding to the "web site is two-tier" attribute. This attribute, if set, prunes the graph at the "web site" OR node 601. The resulting realization is the sub-tree rooted at node 603, shown with solid edges.

Figure 8:
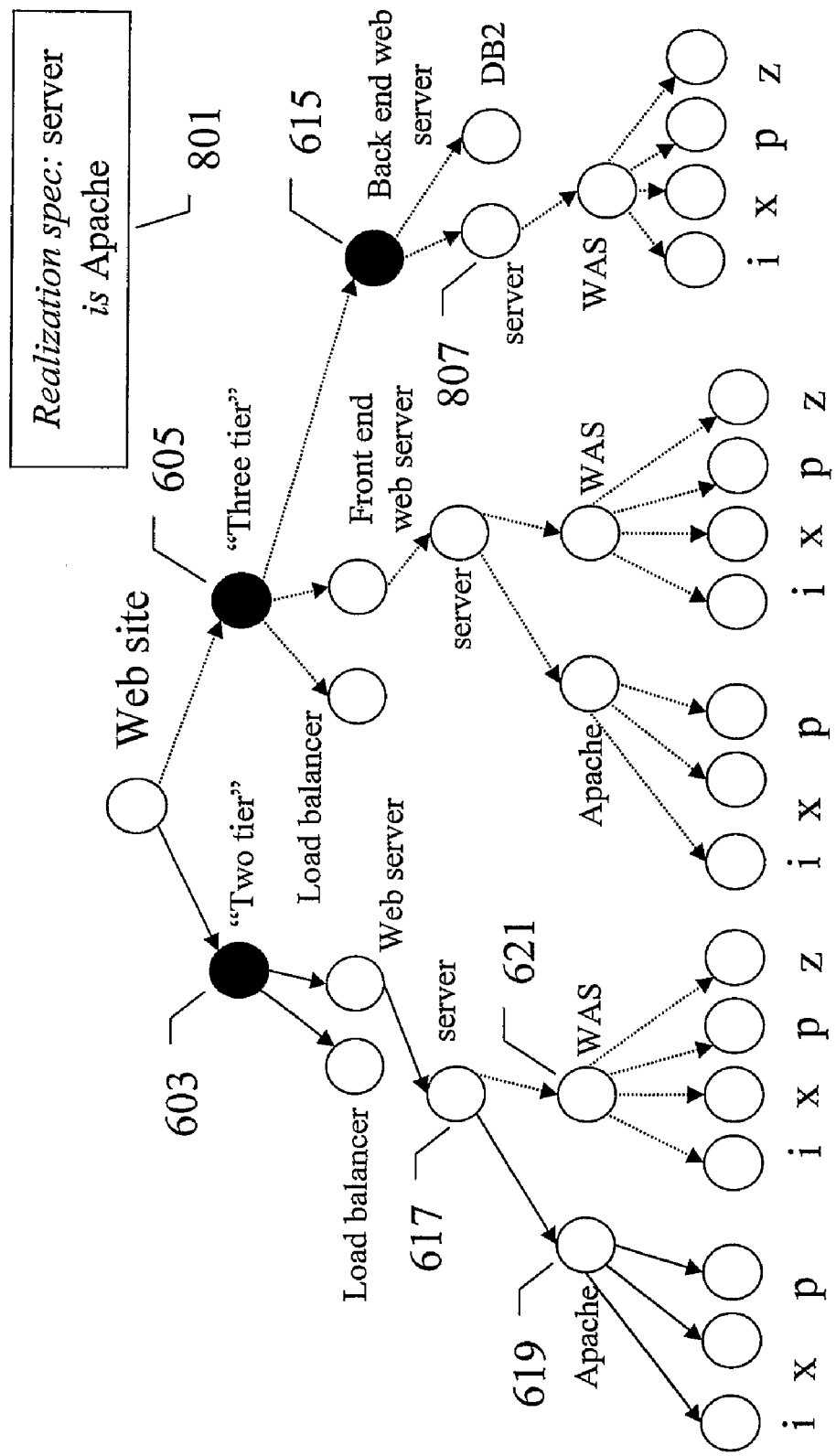
FIG. 8 shows a Web site realization pruned by server attribute in accordance with the present invention.

A more complex example is shown in FIG. 8. The attribute "Server is Apache" 801 specifies that any "server" OR node in the realization must have an "Apache" node as a direct descendant, such as the descendant of server node 617. Other descendants of the "server" OR node are pruned, such as node 621. If an "Apache" node is not specified as a direct descendant of a "server" node in the initial realization, as in node 807, the entire "server" node is pruned. If the pruned "server" node is the only direct descendant of an OR node, or if it is any direct descendant of an AND node then this node is pruned, such as node 615, and so on in a recursive manner, with node 605. The application of this process results in the realization that is the two-tier realization rooted at node 603, with a web server 617 realized as Apache server 619. The realization is shown as with solid arrows. Any descendant of node 619 is an acceptable alternative.

Figure 9:
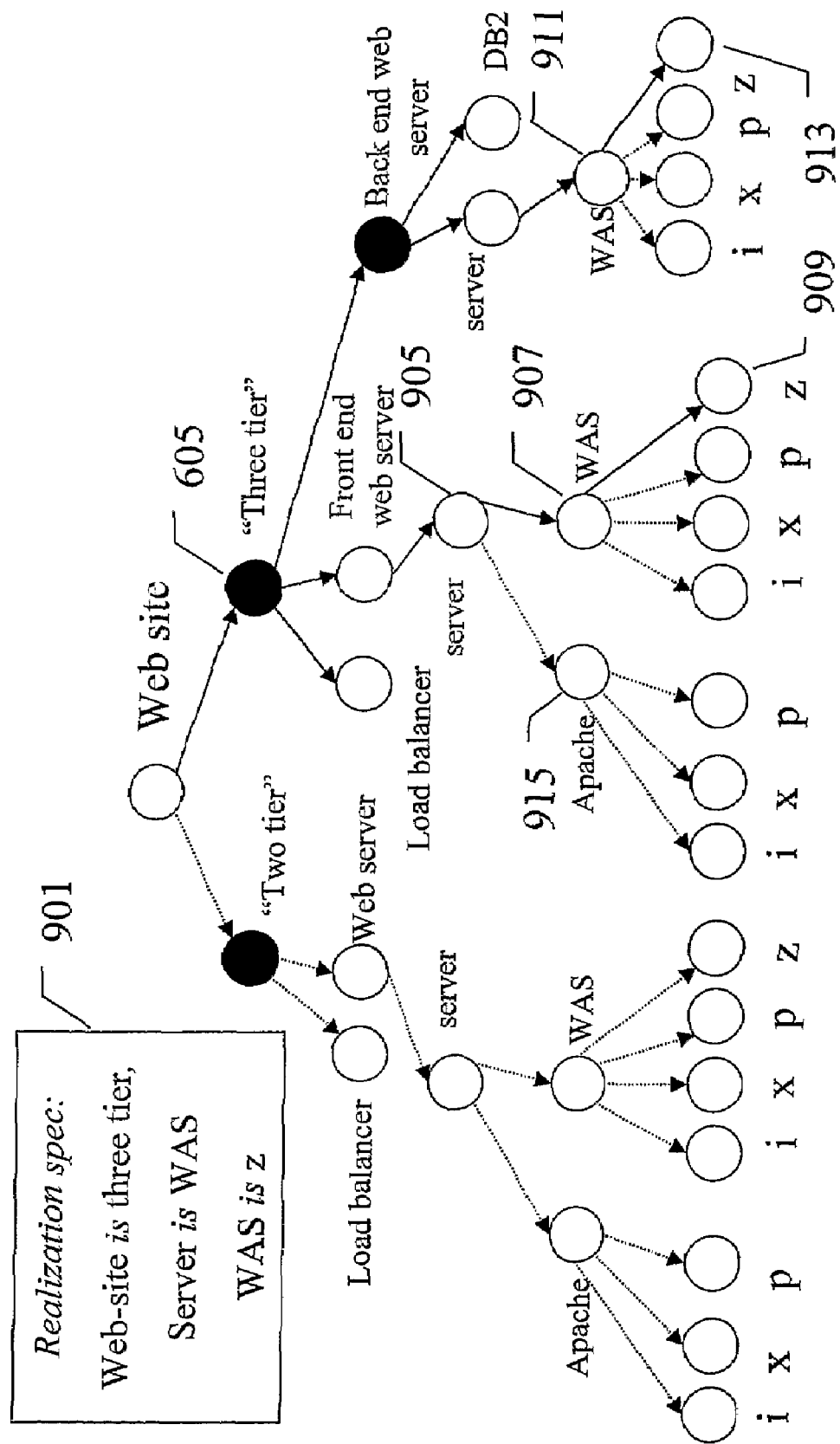
FIG. 9 shows a Web site realization pruned by tier, Server, and, WAS attributes in accordance with the present invention.

Multiple attributes may be specified as part of the realization-spec. FIG. 9 shows a realization-spec with multiple attributes 901. The resulting realization is three-tier web site 605 with front end server 905 realized as WAS server 907 on server type zSeries 909. Similarly, back end web server realized as WAS server 911 is also realized with zSeries 913. This realization is shown with solid arrows.

The above pruning algorithm can be semi-formally described as follows:

Prune_one (S,R):

For an attribute S=[NODE_NAME is CONDITION], and for a realization R with a set of nodes NODES.

1. Let Pruned=empty-set.
2. For every node N∈NODES:
    If N is an OR node then
        If N=NODE_NAME then
            For every direct descendant M of N in R:
                If M does not satisfy CONDITION then
                    Pruned=pruned∪{M}
3. For every node N∈NODES\Pruned:
    If N is an OR node then
        If all descendants of N are in Pruned then
            Pruned=pruned∪{N}
4. For every node N∈NODES\Pruned:
    If N is an AND node then
        If N has a descendant M s.t. M∈Pruned then
            Pruned=pruned∪{N}
5. Repeat steps 3 and 4 until an iteration is reached where the set Pruned is not changed.
6. Return the tree of nodes that are reachable from the root and are not pruned (if the root is pruned return the empty tree).

Prune_all(LS,R):

For a list of attributes LS=L1,L2, . . . , Ln,

And for a realization R
1. New_R=R
2. For i=1 . . . , n:
    New_R=prune_one(New_R,Li)
3. Return New_R Note that these examples are based on a realizer that allows all of the OR node attributes to be specified in the realize request. The realizer need not expose all of these choices. It may also group a set of choices as a single attribute, such as "non-Intel servers".

Also note that more complex attributes may be defined and used. For example, using the keyword contains instead of is, attributes can be specified on nodes in the sub-tree rooted by a node and not only on direct descendant of it. The pruning algorithm can be changed in a straight forward way to handle also these cases. As an example, consider again the result of the realization described in FIG. 9. The same realization result also corresponds to the following realization-spec with only two attributes: "Web-site is two-tier" and "Server contains z". Although it is not specified that a server must be WAS, the Apache possibility 915 is pruned because the sub-tree rooted by it does not contain a "z" resource.

Operation of the Realizers

Figure 10:
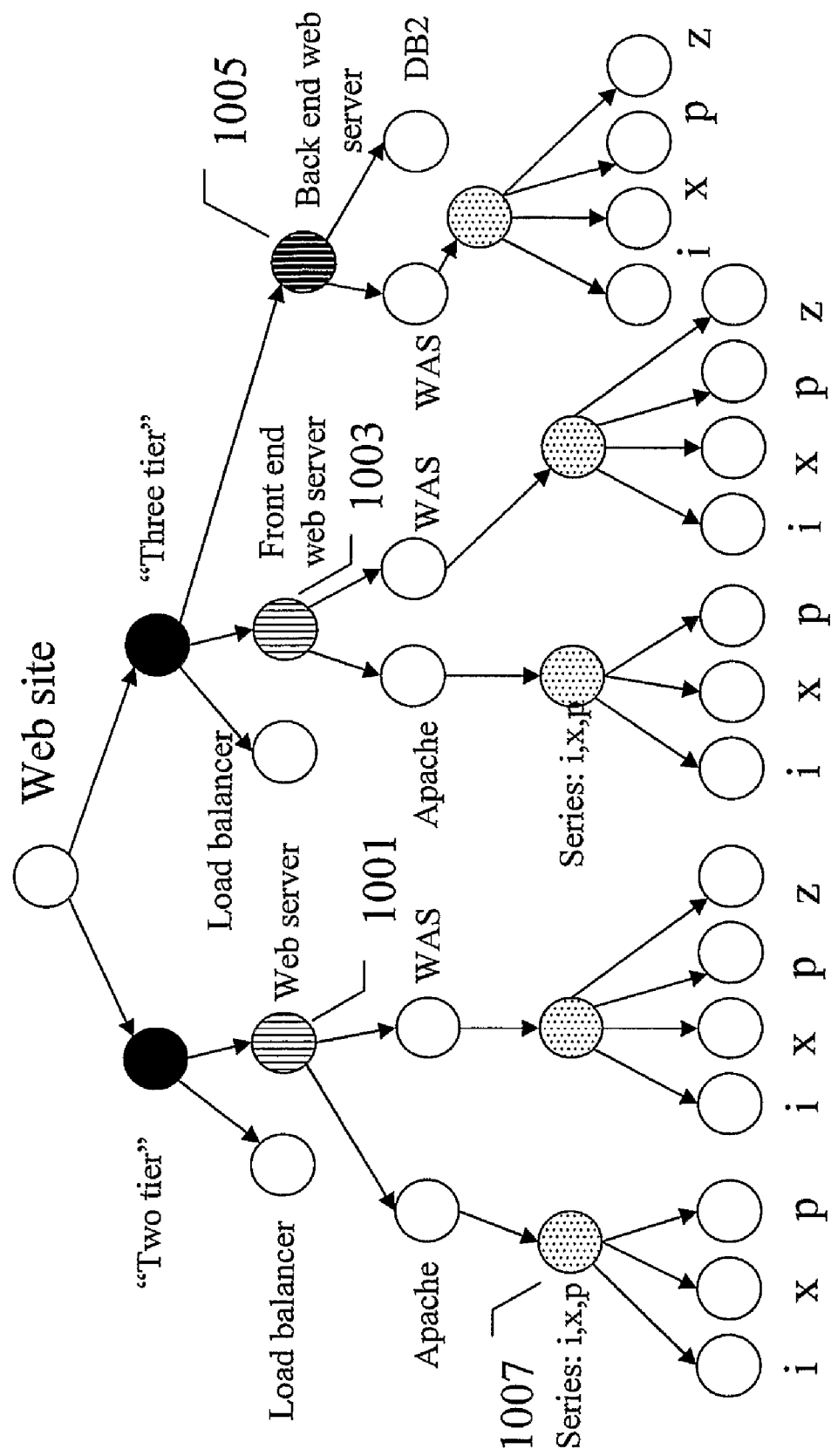
FIG. 10 shows a Web site realization and its components, where each component corresponds to a PRS and MRS structure in accordance with the present invention.

Since composite resources may be assembled using base or other composite resources, realizers invoke the realizers of sub-resources. FIG. 10 shows the Web site example using two sub-resources, Web server and server. The Web server realizer supplies the sub-graphs rooted at striped nodes 1001, 1003, and 1005. This realizer can supply front end or back end web server types. Node 1005 is darker than nodes 1001 and 1003 because it is both an AND node and a sub-resource node. The server realizer supplies the sub-graphs rooted at dotted nodes, such as node 1007. The server realizer can supply servers of the different IBM server architectures with compatible operating systems. Note that in this example, the Apache Web server realizer calls the server realizer 1007 with only the iSeries, xSeries, or pSeries server type. The zSeries option is not shown for Apache in the graph.

Figure 11:
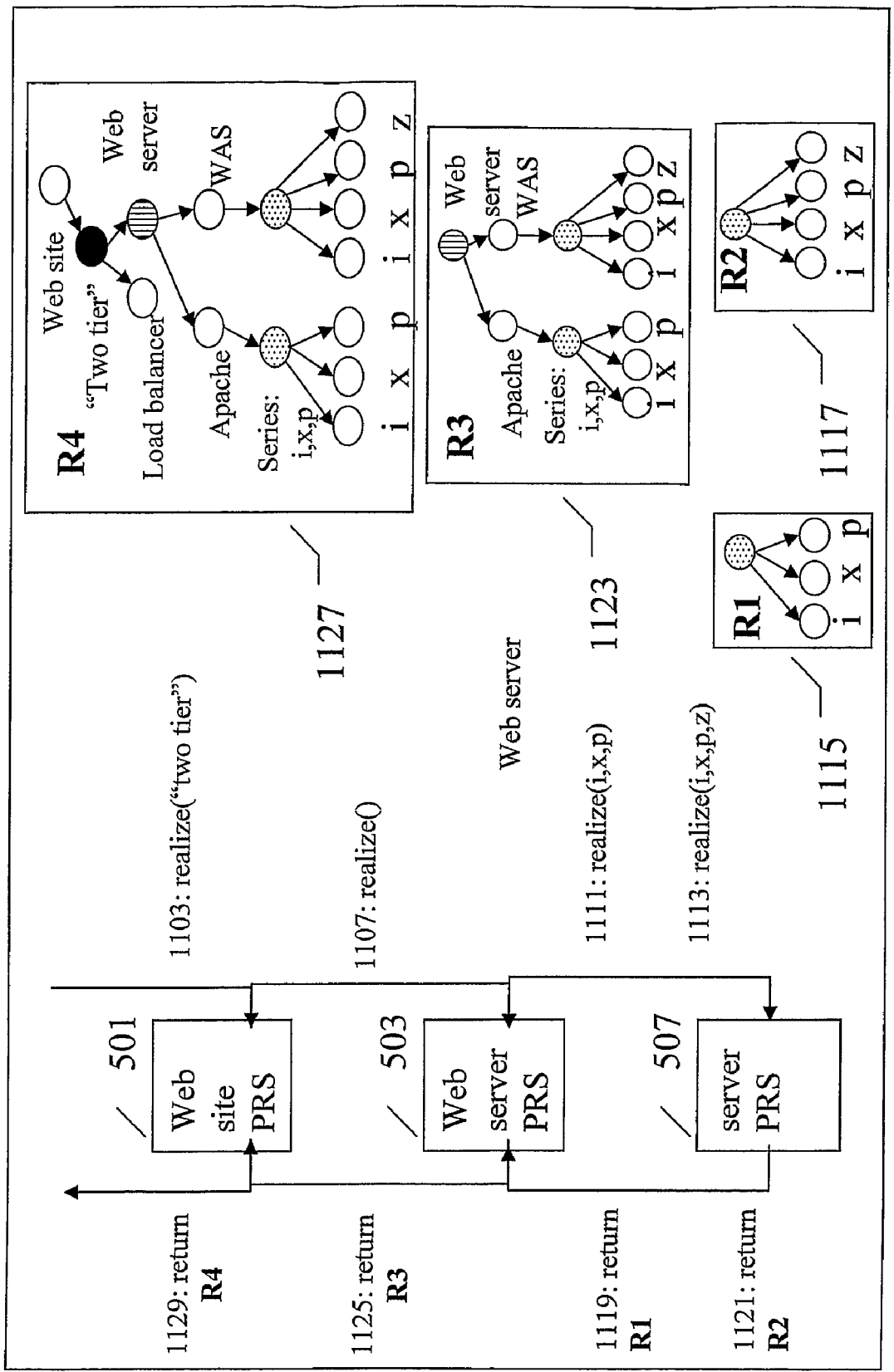
FIG. 11 shows an example of operations of the Realizers involved in the construction of a Web site realization in accordance with the present invention.

FIG. 11 shows the process of generating the realization. The Web site PRS 501 receives Realize request 1103 with a realization-spec with the attribute "two-tier". Web site realizer 501 calls the web server realizer 503 with Realize request 1107. The web server realizer 503 in turn calls the server realizer 507 twice, with Realize requests 1111 and 1113. The results of requests 1111 and 1113 are the realizations R1 1115 and R2 1117 returned by responses 1119 and 1121. The Web server realizer uses R1 and R2 to build the realization R3 1123 which is returned on response 1125 in answer to request 1107. Last, the Web-site realizer user R3 to construct the realization R4 1127 which is returned on response 1129 from the initial request 1103.

Realizations may be obtained well in advance of the time that a composite resource is constructed, and they may be retained for long periods. Circumstances under which realizations should be regenerated include changes in requirements and changes in the base or composite resource types available in the system. Note that a realization does not depend on resource availability. Therefore, changes in the availability of resources do not require regeneration of realizations.

Resource Selection

Once a realization is obtained, the resources corresponding to a single alternative must be allocated. Since a realization can describe multiple alternatives, a ranking mechanism can be used to order the alternatives according to some metric. For example, a set of preferences can be indicated for the remaining alternatives within the realization, and the alternatives could be ordered in terms of number of preferences satisfied. Another ranking metric could be cost. The alternatives are then selected in turn and the base resources are requested for a specific alternative. If the resource request is successful, the tree is annotated with the resource identifiers of the base resources (e.g., reservation tickets or resource handles). Once base resources are obtained, the builder can be invoked to construct the resource. Note that if resource availability changes (e.g., a reservation is canceled by the system), the realization can be used to secure an alternative set of resources.

Builder

The builder receives as input a realization and a set of base resources from which to assemble the resource. The procedures needed for construction of the resource type are encoded in the builder. These procedures encapsulate details of resource dependencies and proper ordering of operations. The realization is annotated with the alternative corresponding to the base resources. The builder traverses the tree in depth-first manner, invokes the builders of sub-resources at nodes as indicated and supplies them with the sub tree of the realization that corresponds to the sub resource.

Figure 12:
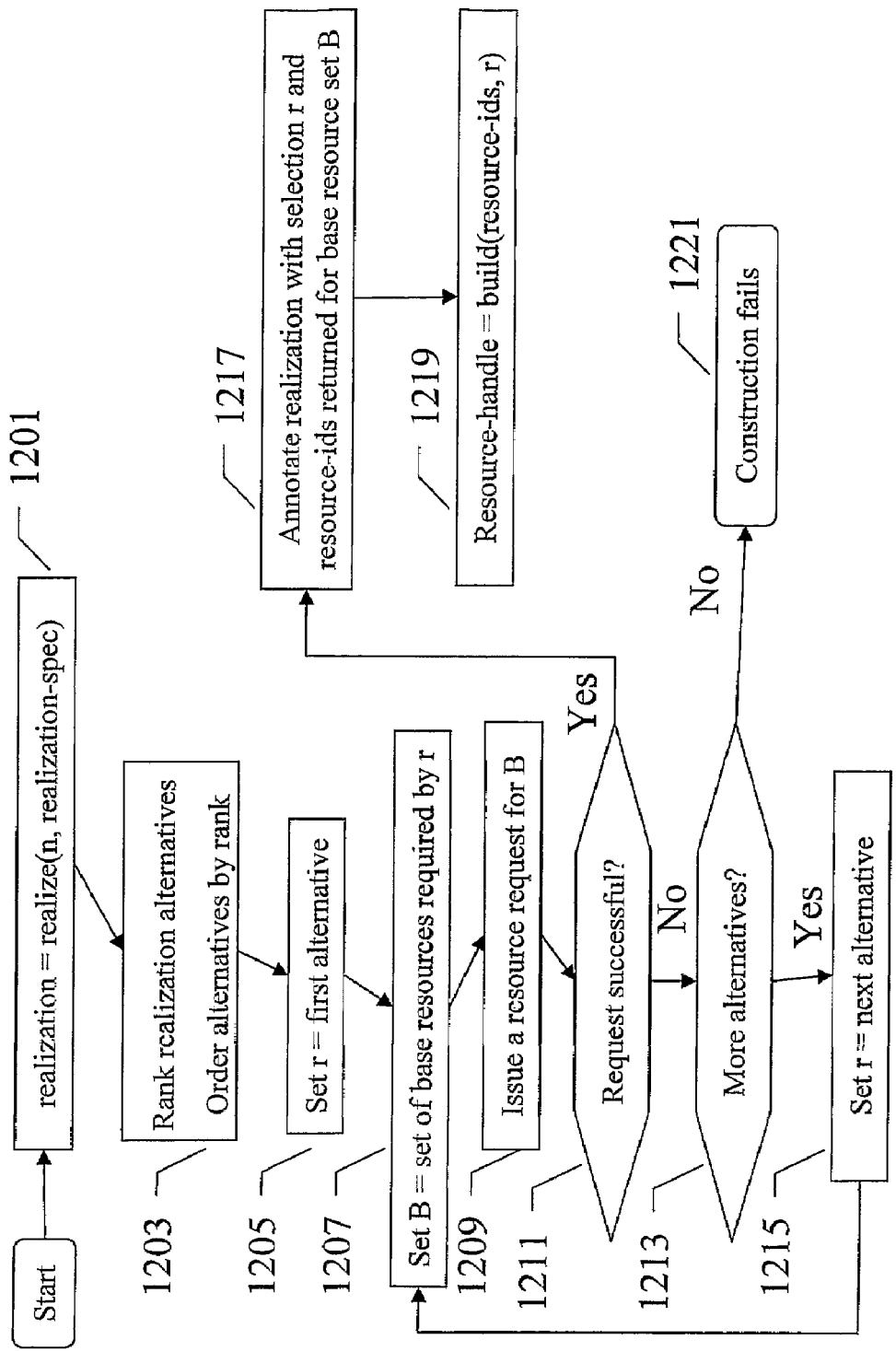
FIG. 12 shows a process used to construct a composite resource in accordance with the present invention.

FIG. 12 shows the process of constructing a composite resource. The process begins in step 1201, in which the realize function of the PRS for the composite resource is called with requirements supplied as attribute settings in the realization-spec, if any. Next in step 1203 the realizations are ranked and ordered by rank. If there are preferences over the alternatives they are addressed in this step. The process then examines the alternatives embodied by the realizations in turn, starting in step 1205 with the first realization. The set of base resources is obtained for the realization in step 1207, and a resource request is issued for the set in step 1209. The result of the request is examined in step 1211. If the request succeeds, flow passes to step 1217, in which the realization is annotated with the current alternative and the resource-ids of the set of base resources secured for it. Then in step 1219 the build function of the PRS is invoked. If in step 1211 the request was not successful, flow passes to step 1213 to determine if there is an alternative realization that may be tried. If there is an alternative realization, the next realization on the list is selected in step 1215 and the process continues with step 1207. If there are no alternatives left, flow passes to step 1221 and the construction of the composite resource fails.

Figure 13:
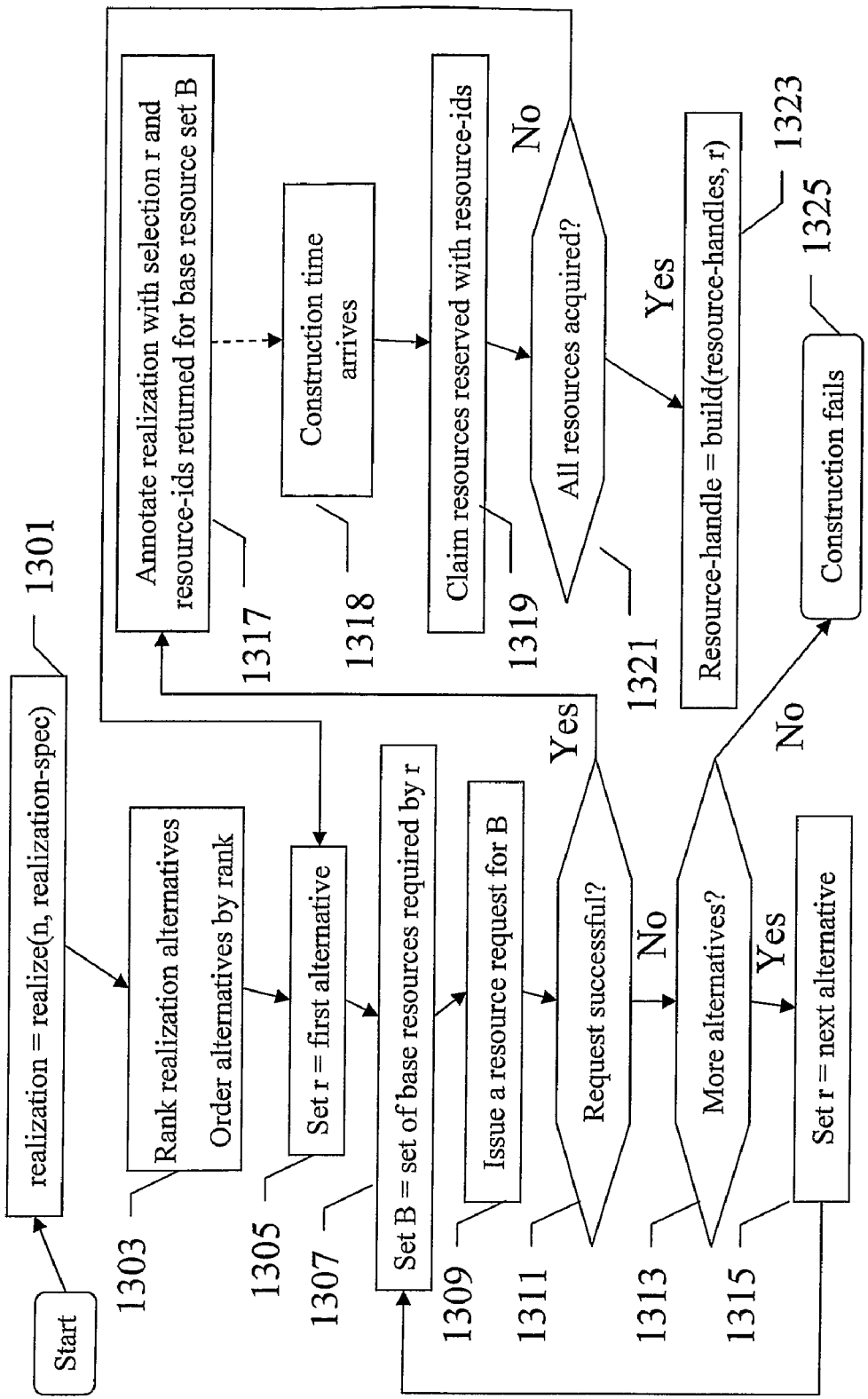
FIG. 13 shows a process used to construct a composite resource in a system with advanced reservations in accordance with the present invention.

In a system that supports advance reservations, the resource identifiers returned may represent reservations for the resource. In that case, another step is needed to claim the resources associated with the reservation. There may be a considerable period before this step occurs, and as a result of other activities during that period, this step may eventually fail. For example, the resources may not be available at the time the reservation is due to begin, for reasons such as failure of the resource, or overbooking of reservations. If the initial attempt to claim the resources is not successful, other alternatives can be tried and recovery may be possible with another set of base resources. The process of constructing a composite resource in a system that supports advance reservations is shown in FIG. 13. The process begins in step 1301, in which the realize function of the PRS for the composite resource is called with requirements supplied as attribute settings in the realization-spec, if any. Next in step 1303 the realizations are ranked and ordered by rank. If there are preferences over the alternatives they are addressed in this step. The process then examines the alternatives embodied by the realizations in turn, starting in step 1305 with the first realization. The set of base resources is obtained for the realization in step 1307, and a resource request is issued for the set in step 1309. The result of the request is examined in step 1311. If the request succeeds, flow passes to step 1317, in which the realization is annotated with the current alternative and the resource identifiers of the set of base resources reserved for it. When the construction time arrives in step 1318, the process attempts to claim the resources associated with the reservation in step 1319. The construction time allows for sufficient time to construct the resource so that it is available at the desired start time. If all of the resources are acquired in step 1321, flow passes to step 1323 where the build function of the PRS is invoked. If all of the resources are not acquired in step 1321, control passes back to step 1305 where the process is repeated starting with the first realization. If in step 1311 the resource request was not successful, flow passes to step 1313 to determine if there is an alternative realization that may be tried. If there is an alternative realization, the next realization on the list is selected in step 1315 and the process continues with step 1307. If there are no alternatives left, flow passes to step 1325 and the construction of the composite resource fails.

Provisioning Operations

Realize(n, realization-spec)->realization[ ]

This request is issued to create a plan for building a resource of the type represented by the PMRS.

Inputs:
n, the maximum number of realizations desired
realization-spec, the settings for attributes exposed by this realizer
These attributes control represent possible variations in the resource. Their settings determine the realizations supplied
Unspecified attribute settings represent additional degrees of freedom.

Outputs:
Realization[ ]. A structure representing the realizations. (list, tree, etc.).
Each realization includes a schema that contains the base resources required for it ("shopping list") and their structure.

Build(base-resource-handles, r)->resource-handle
This interface is used to request the build of a resource of the type represented by the PMRS from the base resources indicated by base-resource-handles.

Inputs:
Base-resource-handles[ ], a list handles for the base resources in the realization
Realization, provided previously by the realizer that is used to describe the structure of the composite resource.

Outputs:
Resource-handle, a handle to the newly constructed resource
On failure this may be set to a 'null' handle UnBuild(composite-resource-handle)->resource-handle[ ]
The interface is used to disassemble a composite resource into the set of base resources used to build it. It is used when resources are to be returned to the BRDS.

Inputs:
Composite-resource-handle, handle of the composite resource.

Outputs:
  Resource-handle[ ], array of handles to the base resources

Managed Resource Service

As described earlier, an MRS for a resource type (composite or base) encapsulates the knowledge of the operation of the resource. An MRS is instantiated for a resource when the resource is created by the corresponding PRS. A reference to the MRS instance is returned from the build operation on the PRS.

Figure 14:
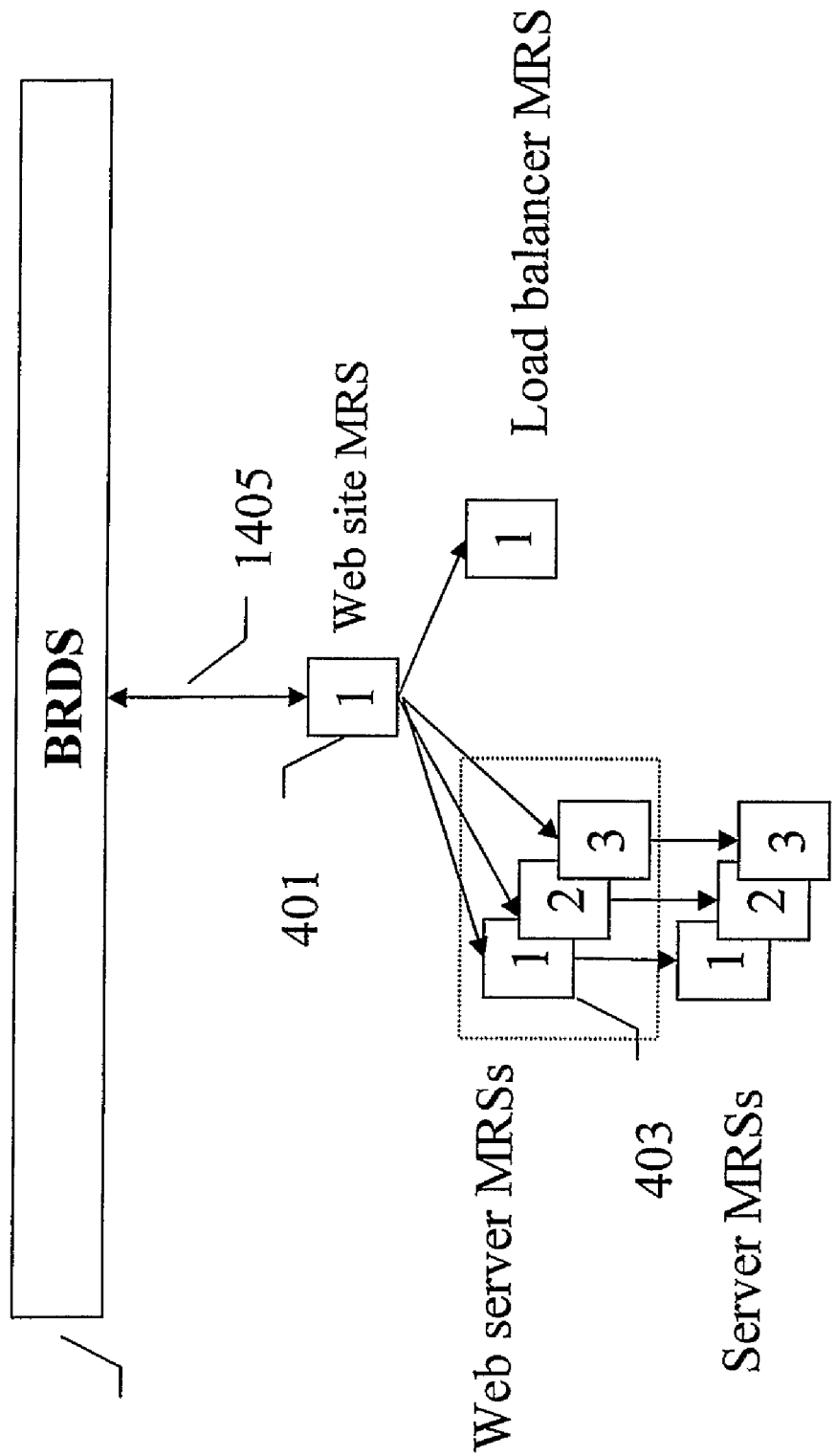
FIG. 14 shows an example of PMRS interaction with BRDS in accordance with the present invention.

Recall that an MRS for a composite resource type can use the MRSs of the sub-resources in the management of the composite resource. This structure is shown in FIG. 14 for the web site computing environment of FIG. 4. Every computing environment that has resources allocated to it has one designated root MRS. The root MRS in FIG. 14 is the Web site MRS 401. All other MRS instances are associated beneath this root MRS. Only the root MRS communicates with the BRDS 219. The root MRS generates resource management requests 1405 based on the system's knowledge taking into account factors such as the system's performance and health. These requests may modify the set of base resources used by computing environment corresponding to the root MRS. An MRS must implement the operations described in the BRDS resource management interface described in cross-referenced application "Hierarchical Resource Management for a Computing Utility", having Ser. No. 10/587,618. Lower level MRSs can only generate internal requests for more capacity that will be propagated through the hierarchy to the root MRS. Note that an MRS for a given resource type may be a root MRS in one computing environment but not in another.

To compose MRSs, the resource management interface is replicated at each level, with upper level interfaces receiving and propagating requests between BRDS and the lowest level MRSs, such as between web server MRS 493 and web site MRS 401. Intermediate MRSs may filter out requests when appropriate. For example, web site MRS 401 may choose to respond to a resource request from a lower level MRS by reconfiguring existing resources instead of requesting resources from the BRDS. The reasoning behind this structure is that a high level MRS can make more intelligent decisions based on knowledge of the entire composite including interdependencies between the requesting sub resource and other resources.

Figure 15:
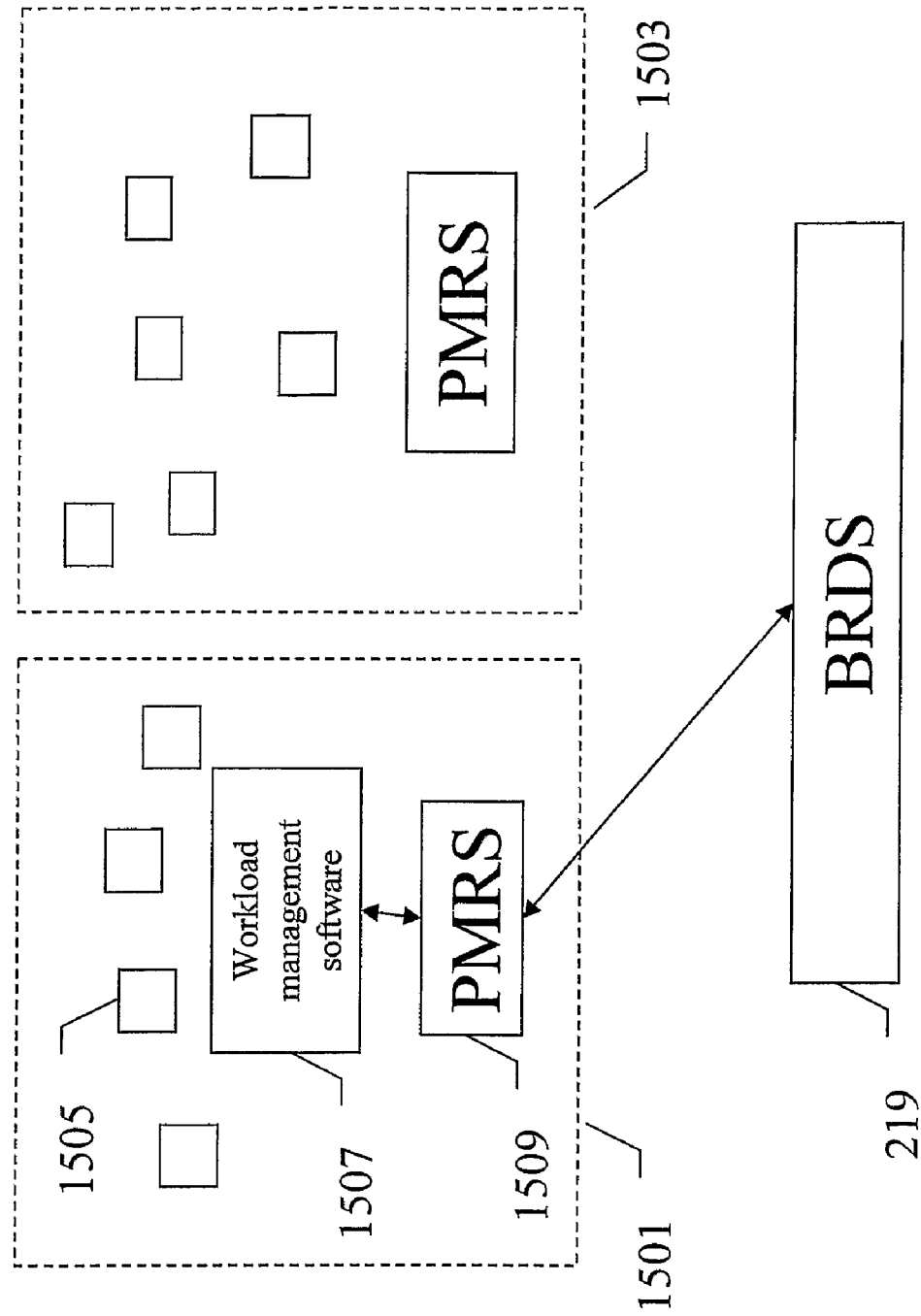
FIG. 15 shows an example of MRS interaction with a third party workload management system in accordance with the present invention.

Third party workload management systems, such as eWLM which is described in an application entitled "SYSTEM AND METHOD FOR ADAPTIVE ADMISSION CONTROL AND RESOURCE MANAGEMENT FOR SERVICE TIME GUARANTEES", having Ser. No. 10/439,791, can also be represented in the PMRS structure as shown in FIG. 15. Two computing environments 1501 and 1503 employ resources such as servers 1505, and workload management software 1507 to manage workload over the servers. The workload management software is configured and build into the composite resource for the computing environment by the PRS part of PMRS 1509. The MRS part of PMRS 1509 functions as an adapter capable of interacting with the workload management software. This adapter layer interprets its state and requests more resources if necessary from BRDS 219.

Internal Structure of MRS

The functionality and operational interface provided by an MRS is resource specific. A wide variety of functions are possible. In general, all of the functions contained within an MRS are associated with the management of a resource which includes configuration, operation, and maintenance. For example, an MRS may be capable of monitoring, which includes gathering events or other metrics from other sources in the system, applying some function such as smoothing or aggregation, and generating metrics events that describe the operational state of the resource. A generic interface may be provided to indicate which metrics or events are produced and consumed by an MRS. The metrics collected within an MRS may be reported to another part of the system such as a billing system or another MRS. Another type of functionality is configuration, and generic operations may be provided to get and set configuration parameters, and to change the state of a resource to optimize its behavior. A third type of functionality provides self-managing capabilities by receiving metrics or events that describe the state of the managed resource and determining what action to take, if any, to keep the resource operating at the required level (e.g., as specified in an SLA). There are essentially two types of operations that can be initiated in this way: changing the operational state of the resource by reconfiguring it or its sub-resources using the appropriate configuration operations, and changing the capacity of a resource or sub-resource. Changing the configuration of a sub-resource can be done through its MRS. Changing capacity of resources is a more involved process. An increase in capacity could be requested because of failure to meet an SLA or because of some projected future load modification. Either the requested new resources would have to be specified on the request or an analysis would have to be done to determine where the bottleneck is and what resources (or configurations) would be required to alleviate the bottleneck. Once this is done a realizer service is used to obtain a shopping list of basic resources, and requests are sent to the BRDS to obtain the resources. Once the resources are obtained, the builder is invoked with the resource handles. A decrease in capacity could also be caused by an SLA and would not require a realization step because existing resources would be returned.

Process and Methodology to Incorporate New Resources or Services

Figure 16:
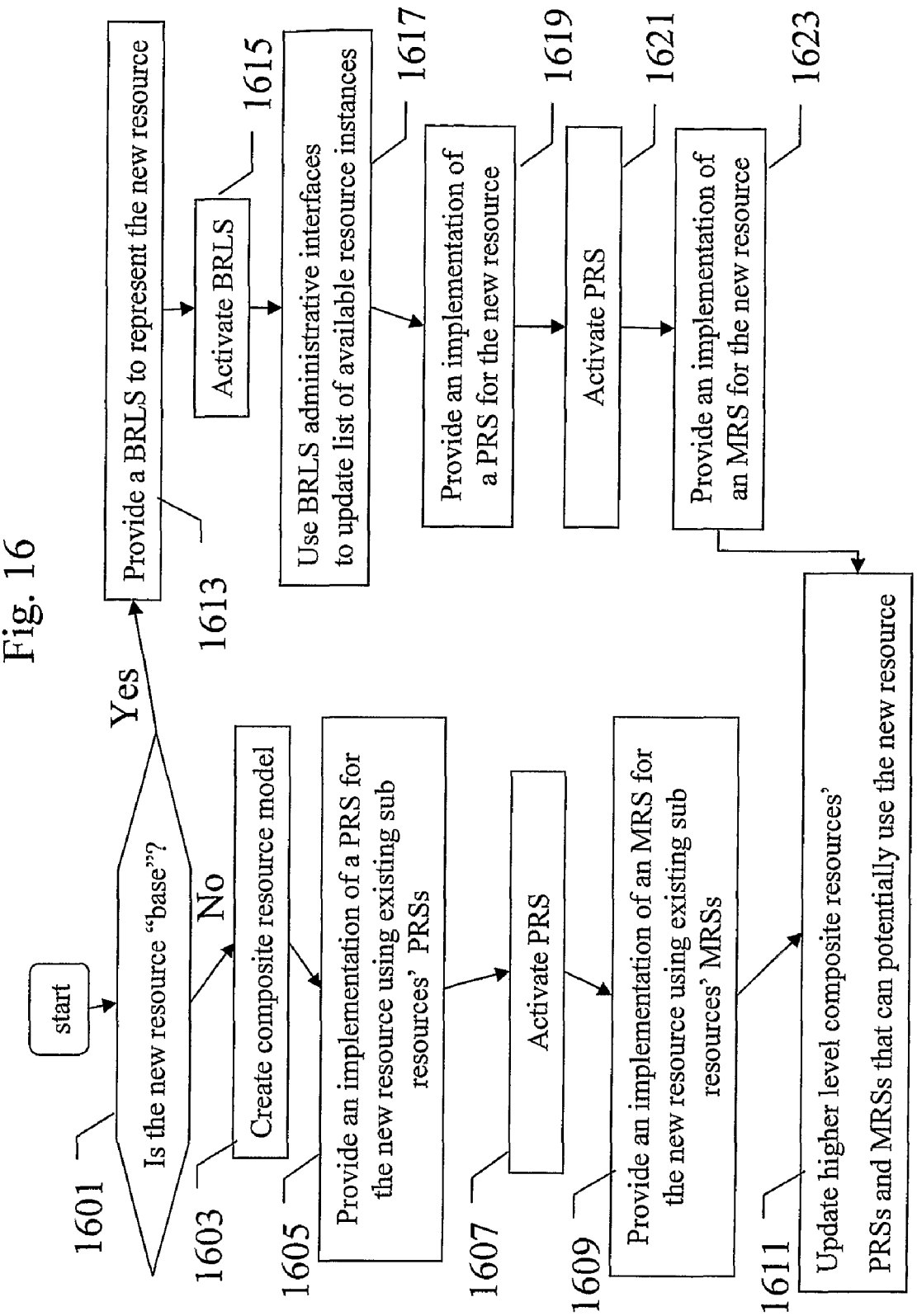
FIG. 16 shows s an example of how to add a new base or composite resource type to the system in accordance with the present invention.

One of the benefits of the invention is the ability of the apparatus to cope with a dynamic system in which new resource types and services are introduced. FIG. 16 shows a process to be followed when a new base resource is introduced. The process begins in step 1601 with a determination of whether or not the resource to be introduced is a base resource. If the resource is a base resource, flow passes to step 1613, where a BRLS for the new base resource type needs to be provided. The BRLS is then activated in step 1615, and updated in step 1617 with the information on available resource instances through the BRLSs administrative interfaces (see cross-referenced application Ser. No. 10/587,618). Next in step 1619 a PRS implementation must be provided for the new resource. The new PRS is activated in step 1621, as there must be a single PRS for every resource type in the system. In step 1623, an MRS implementation must be provided for the new resource. Finally in step 1611, the logic of any component that wishes to leverage the new resource needs to be updated. It is this step that allows preexisting services to take advantage of the newly defined resource. The circumstances which a new resource is incorporated into preexisting services, and the extent to which this incorporation is automated, can be a matter of service provider or installation policy. Examples of components that need to be updated are PRSs and MRSs of composite resources that can now realize the resource they represent using the new base resource. For example, introducing a new type of machine (such as an xSeries server), a Web server PRS may need to be updated to offer realizations which includes also the possibility of using the new machine type. In particular, both the realizer function of a PRS and the build function may need to be updated. No changes are necessary in other parts of the system.

For a composite resource, the process continues with step 1603, modeling the composite resource's possible structures; list of sub resources, how are they interrelated and in particular how they are configured to work together. The result is step 1605, an implementation of a realizer and builder functions in a PRS for the new composite resource that uses existing resources' PRSs as part of its logic to realize and build the composite resource. In step 1607 the new PRS is activated. Next in step 1609, an MRS implementation is provided for the new composite resource that uses existing sub resources' MRSs as part of its logic to manage the composite resource. The process completes with updating existing higher level composite resources where necessary to take advantage of the new composite resource in step 1611. For example, a Web site composite resource may be updated to take advantage of a new Secure Web server composite resource (assuming that previously only simple Web server composite resource was available).

The process to incorporate and support a new service type is similar to the one for composite resources as services are modeled as composite resources. These processes enable a service provider or other agent involved with the operation of the computing utility to increase the services offered to customers. Note that the implementer of the new services may be distinct from the service provider or operator of the computing utility; new implementations of resources may be provided as packaged upgrades to the service provider, who then installs them to add new resources. A service provider in this context could represent entities either external or internal to a customer or customer's organization. An example of the latter is an IT department within a company. Other steps that may be necessary for a service beyond what is needed for an internally used composite resource, such as publishing the service to the public, are beyond the scope of this invention.

Use Cases

Figure 17:
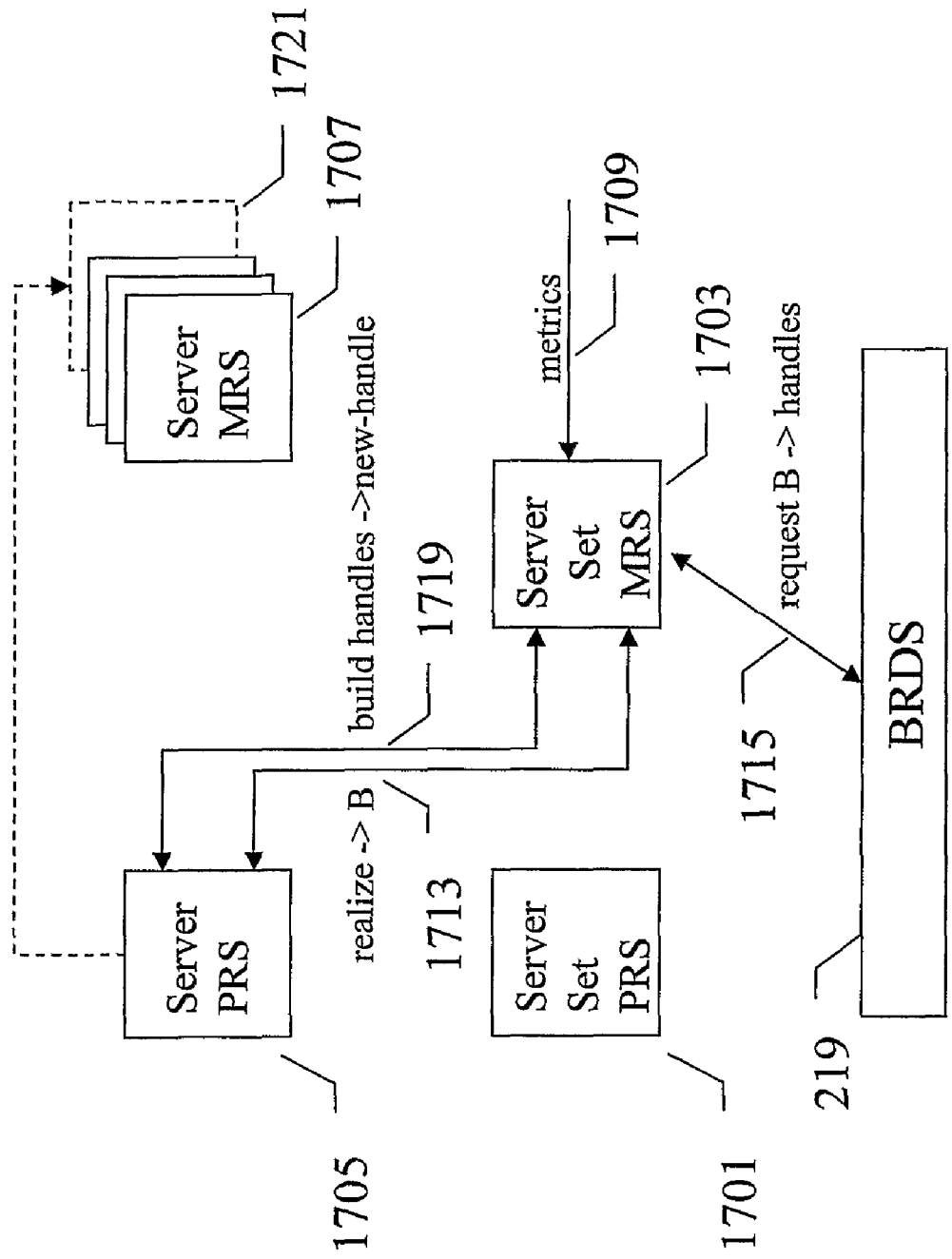
FIG. 17 is a use case that describes adding a Linux server to a Linux server group service based on a load event in accordance with the present invention.

Two use cases are shown in the Figures to illustrate the componentized operation of provisioned and managed resources. The first use case, in FIG. 17, shows a computing environment consisting of a set of servers. The set is modeled as a composite resource for which a PRS 1701 and an MRS 1703 exist. The MRS 1703 is the designated root MRS for the computing environment. Each individual server is modeled as a resource, with PRS 1705. There are three servers in the set, as exemplified by MRS 1707. Server set MRS receives monitoring data 1709 that indicates that the capacity of the group should be increased. MRS 1703 decides to add a server. It issues realize request 1713 to server PRS 1705 to obtain a resource list B and plan to build another server. Only B is shown in the figure. It then issues a resource request 1715 to the BRDS 219 to obtain the resources. In this case there are no advance reservations; the BRDS returns resource handles. MRS 1703 then invokes the builder of server PRS 1705 via request 1719 with the resource handles. A new server MRS 1721 is instantiated. Upon completion of the build request, MRS 1703 may update its state with the new server's resource handle and additionally perform any configuration needed to add the new server to the set.

The second use case, in FIG. 18, shows a more complex resource structure in the form of a capacity increase for a Web site. The root MRS is the web site MRS 401. Again, monitoring data 1803 arrives at the root MRS that indicates that the capacity of the Web site must be increased. MRS 401 decides to add a Web server. It issues a realize request 1807 to the Web server PRS 503. The Web server MRS in turn invokes the realize operation 1811 of the server PRS 507. The list of base resources is obtained and a request 1815 is issued to BRDS 219 as in the previous use case. The resource handles are returned and passed to the builders of the component resources via build requests 1819 and 1821. The server and Web server builders instantiate MRSs 1825 and 1827 to represent the new server and Web server instances, respectively. Finally, the root MRS 401 configures the new server via configure request 1831 to the load balancer through its MRS 405 to include the new server as part of the Web site.

Thus, the present invention includes a method for provisioning one or more computing environment in a computing utility, said method comprising: employing a description of each of the one or more computing environment, the description directing an invocation of a first service which performs the provisioning, the description being a composite resource definition; and invoking the first service to perform the provisioning.

In some embodiments of the method, the step of obtaining a plan, or realization, is repeated when there are changes in the description of the computing environment, changes in the set of base or composite resource types, or any combination of these changes.

In some embodiments of the method, the steps of selecting a plan and requesting the resources associated with it are repeated when there are changes in the selection criteria, resource availability, resource reservation status, changes in plans, or any combination of these changes.

In further embodiments of the present invention, the mapping of provisioning resource services and managed resource services to resource types and instances may vary based on considerations such as performance, availability, and security. For example, multiple provisioning resource services may be used to supply instances of a resource type for better performance. A single provisioning resource service that accepts the type as input may be used for provisioning all resource types. A single managed resource service may manage all instances of a resource type. Alternatively, if isolation is required between components of different computing environments, a single managed resource service may manage multiple instances of a resource type within a computing environment. Further, the partitioning of provisioning and managed resource services into two components can also vary. For example, they can be realized as a single service or a collection of services. Finally, provisioning resource services and managed resource services may themselves be realized as single services or collections of services. For example, the builder and realizer functions of the provisioning resource service could be instantiated as separate services. Those skilled in the art will realize that many such variations are possible, and that these embodiments are merely illustrative and not restrictive of the invention.

The invention also includes an apparatus comprising a set of provisioning resource services that transform a description of a computing environment into a plan for constructing a set of resources to provide the computing environment, where the computing environment is represented as a composite resource definition. In some embodiments of the apparatus, the set of provisioning resource services is to construct the resources into the computing environment according to the plan, and the one or more provisioning resource service to make available a managed resource service to manage the computing environment.

The invention also includes a method that obtains a description of a computing environment, wherein the description is represented as a composite resource definition, and transforms a description of a computing environment into a plan for constructing a set of resources to provide the computing environment. In some embodiments of the method, it also constructs the resources into the computing environment according to the plan, and makes available a managed resource service to manage the computing environment.

Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

We claim:

1. A method, performed by a computer system, for automatically provisioning and managing resources in a computing utility, the method comprising provisioning at least one computing environment in the computing utility, said step of provisioning comprising:

employing a description of each of said at least one computing environment, said description directing an invocation of a first service which performs said provisioning, said description being a composite resource definition; and invoking said first service to perform said provisioning, wherein said first service is a provisioning resource service, and said method further comprises said first service making available a managed resource service for managing each of said at least one computing environment;

wherein there is at least one provisioning resource service associated with each type of base resource and each type of composite resource;

wherein said provisioning resource service provides a plurality of provisioning instances;

wherein said provisioning resource service is comprised of a group of provisioning resource services, each member of said group of provisioning resource services is associated with a particular type of resource in said composite resource description;

wherein the step of invoking further comprising employing said provisioning resource service for the computing environment by recursively employing each member of said group of provisioning resource services according to said composite resource description;

wherein each said base resource has a base resource instance, and wherein there is at least one managed resource service associated with each base resource instance;

wherein there is one managed resource service for all instances of a resource type within a single computing environment;

wherein said composite resource has a composite resource instance, and wherein there is at least one managed resource service associated with each composite resource instance;

wherein said managed resource service is comprised of a group of managed resource services, each member of said group of managed resource services is associated with a particular instance of resource in said composite resource description;

wherein the step of invoking comprises:

obtaining at least one plan to satisfy said at least one computing environment;

selecting a particular plan;

requesting base resources corresponding to said particular plan from said computing utility;

repeating the steps of selecting and requesting until said base resources corresponding to said particular plan is obtained; and configuring said base resources into an instance of said computing environment;

transforming reservations for said base resources into allocated base resources; and iterating the steps of repeating and transforming until said base resources are obtained;
wherein said base resources satisfy a request criterion taken from a group of request criteria comprising:
a designated time at which resources will be provisioned;
duration of resource availability;
resource-specific selection criteria; and
any combination of these request criteria,
wherein the step of obtaining said at least one plan comprises recursively obtaining at least one plan for each sub-resource, and combining the result;
wherein the step of configuring said base resources into an instance of said computing environment comprises recursively configuring base resources corresponding to each sub-resource, and configuring the result;
wherein the step of obtaining further comprises specifying at least one condition restricting plans obtained;
wherein the step of obtaining is repeated according to a repetition criterion taken from a group of repetition criteria comprising: changes in the description of the at least one computing environment, changes in a set of base resource types, changes in a set of composite resource types; and any combination of these repetition criteria;
wherein the steps of selecting and requesting are repeated according to a repetition criterion taken from a group of repetition criteria comprising: changes in the selection criteria, changes in resource availability, changes in resource reservation status, changes in said at least one plan; and any combination of these repetition criteria;
wherein the steps of obtaining, selecting, requesting, and configuring are invoked at least once by a particular managed resource service to add resources to said computing environment; and
wherein the step of selecting said plan satisfies a selection criterion taken from a group of selection criteria comprising: cost, performance; and number of preferences satisfied; and any combination of these selection criteria.

* * * * *